United States Patent
Harris

(10) Patent No.: US 9,159,207 B2
(45) Date of Patent: Oct. 13, 2015

(54) HAPTIC DEVICE

(75) Inventor: Neil Harris, Cambourne (GB)

(73) Assignee: Hiwave Technologies (UK) Limited, Cambridgeshire (GB)

( * ) Notice: Subject to any disclaimer, the term of this patent is extended or adjusted under 35 U.S.C. 154(b) by 274 days.

(21) Appl. No.: 13/811,901

(22) PCT Filed: Jul. 25, 2011

(86) PCT No.: PCT/GB2011/051416
§ 371 (c)(1),
(2), (4) Date: Jun. 12, 2013

(87) PCT Pub. No.: WO2012/010911
PCT Pub. Date: Jan. 26, 2012

(65) Prior Publication Data
US 2013/0278400 A1    Oct. 24, 2013

(30) Foreign Application Priority Data
Jul. 23, 2010    (GB) .................................... 1012387.5

(51) Int. Cl.
*H04B 3/36* (2006.01)
*G01F 7/00* (2006.01)
(Continued)

(52) U.S. Cl.
CPC *G08B 6/00* (2013.01); *G06F 3/016* (2013.01); *G06F 3/041* (2013.01); *G06F 3/0436* (2013.01)

(58) Field of Classification Search
CPC ......... G08B 6/00; G06F 3/016; G06F 3/0436; G06F 3/041
USPC .................. 340/407.1, 407.2, 683, 965, 4.12; 702/56, 153, 151, 190, 54, 17, 197; 345/173, 177, 179
See application file for complete search history.

(56) References Cited

U.S. PATENT DOCUMENTS 4,885,565 A    12/1989    Embach
5,638,060 A     6/1997    Kataoka
(Continued)

FOREIGN PATENT DOCUMENTS

GB    2346455 A    8/2000
GB    2462465 A    2/2010

OTHER PUBLICATIONS

International Search Report and Written Opinion dated Feb. 14, 2012 regarding PCT/GB2011/051417.
Punchalard R et al: "A robust variable step-size LMS-like algorithm for a second-order adaptive IIR notch filter for frequency detection", Wireless Communications, 2001. (SPAWC '01). 2001 IEEE Third Workshop on Signal Processing Advances in Mar. 20-23, 2001, Piscataway, NJ, USA, IEEE, Mar. 20, 2001, pp. 232-234, XP010542314, ISBN: 978-0-7803-6720-3 the whole document.

(Continued)

*Primary Examiner* — Hoi Lau
(74) *Attorney, Agent, or Firm* — Arent Fox LLP

(57) ABSTRACT

A method of generating a haptic sensation comprising: determining an initial estimate of a filter to be applied to a respective signal input to each transducer; defining a model of the system; calculating the vibration of the member as an output of the model of the system; calculating a reference error value for the output of the model; determining changed parameter values of the parameters of the model; recalculating the error value for the output of the model; comparing the recalculated error value with the reference error value; setting the recalculated error value as the reference error value, setting the changed parameter values as the model parameters, and repeating the above steps, or outputting the model parameters; generating a new filter using the output model parameters; and applying the new filters to respective input signals applied to each transducer to generate vibration within the member to provide the haptic sensation.

40 Claims, 14 Drawing Sheets

(51) Int. Cl.
  *G01F 23/00* (2006.01)
  *G08B 6/00* (2006.01)
  *G06F 3/01* (2006.01)
  *G06F 3/043* (2006.01)
  *G06F 3/041* (2006.01)

(56) References Cited

U.S. PATENT DOCUMENTS

| | | | |
|---|---|---|---|
| 5,805,147 A * | 9/1998 | Tokioka et al. | 345/173 |
| 5,818,429 A * | 10/1998 | Tanaka et al. | 345/173 |
| 5,977,867 A | 11/1999 | Blouin | |
| 6,647,352 B1 * | 11/2003 | Horton | 702/151 |
| 6,999,884 B2 * | 2/2006 | Astley et al. | 702/56 |
| 7,216,055 B1 * | 5/2007 | Horton et al. | 702/153 |
| 7,418,364 B1 * | 8/2008 | Horton et al. | 702/153 |
| 7,525,050 B1 | 4/2009 | Weaver | |
| 2002/0075135 A1 | 6/2002 | Brown | |
| 2005/0146512 A1 | 7/2005 | Hill | |
| 2010/0153845 A1 | 6/2010 | Gregorio et al. | |
| 2010/0156818 A1 | 6/2010 | Burrough et al. | |
| 2013/0249831 A1 * | 9/2013 | Harris | 345/173 |
| 2013/0278400 A1 * | 10/2013 | Harris | 340/407.1 |
| 2014/0320402 A1 * | 10/2014 | Stahlberg | 345/156 |

OTHER PUBLICATIONS

Dunne B E et al: "Analysis of Gradient Algorithms for TLS-Based Adaptive IIR Filters", IEEE Transactions on Signal Processing, IEEE Service Center, New York, NY, US, vol. 52, No. 12, Dec. 1, 2004, pp. 3345-3356, XP011122078, ISSN: 1053-587X, DOI: 10.1109/TSP.2004.837408, the whole document.

Bernard Widrow and Max Kamenetsky: "On the efficiency of adaptive algorithms" In: Simon Haykin, Bernard Widrow: "Least-Mean-Square Adaptive Filters", Sep. 8, 2003, Wiley and sons, Inc., XP002668662, ISBN: 0-471-21570-8 pp. 1-34, pp. 8-9.

Laakso: "Energy-based Effective Length of the Impulse Response of a Recursive Filter", IEEE Transactions on Instrumentation and Measurement, vol. 48, No. 1, Jan. 1, 1999, p. 7, X1,55018256, ISSN: 0018-9456, DOI: 10.1109/19.755042 abstract paragraph [OVII].

Great Britain Search Report dated Nov. 25, 2010 regarding GB1012387.5.

International Search Report and Written Opinion dated Jun. 12, 2011, regarding PCT/GB2011/051416. (Actual copies of ISR and Int'l Preliminary Report on Patentability/Written Opinion previously provided to USPTO with Jan. 23, 2013 filing re U.S. Appl. No. 13/811,901).

* cited by examiner

HAPTIC DEVICE

This application is a United States National Stage Application under 35 U.S.C. §371 of International Patent Application No. PCT/GB2011/051416, filed Jul. 25, 2011, which claims benefit to British Application No. 1012387.5, filed Jul. 23, 2010, the entirety of both applications are incorporated herein by reference.

TECHNICAL FIELD

The invention relates to touch sensitive devices including touch sensitive screens or panels.

BACKGROUND ART

U.S. Pat. No. 4,885,565, U.S. Pat. No. 5,638,060, U.S. Pat. No. 5,977,867, US2002/0075135 describe touch-operated apparatus having tactile feedback for a user when touched. In U.S. Pat. No. 4,885,565 an actuator is provided for imparting motion to the CRT when the actuator is energised to provide tactile feedback. In U.S. Pat. No. 5,638,060, a voltage is applied to a piezo-electric element which forms a switch to vibrate the element to apply a reaction force to a user's finger. In U.S. Pat. No. 5,977,867, a tactile feedback unit generates a mechanical vibration sensed by the user when the touch screen is touched with a finger or a pointer. The amplitude, vibration frequency and pulse length of the mechanical vibration are controlled, with the pulse width being long enough to be felt but short enough to terminate before the next key touch. US2002/0075135 describes the use of a second transducer to provide a pulse in the form of transient spike to simulate a button click.

DISCLOSURE OF INVENTION

According to a first aspect of the invention, there is provided a method of generating a desired haptic sensation in a device comprising a member and a plurality of transducers mounted to the member, the method comprising:
  a) determining an initial estimate of a filter to be applied to a respective signal input to each transducer whereby application of the filtered input signals to the transducers generates vibration of the member which provides a haptic sensation;
  b) defining a model of the system whereby the vibration of the member can be calculated as a function of the input signal, the model having a plurality of parameters;
  c) calculating the vibration of the member as an output of the model of the system;
  d) calculating a reference error value for the output of the model by comparing the output of the model with a measured value of vibration of the member;
  e) determining changed parameter values of the parameters of the model;
  f) recalculating the error value for the output of the model by comparing the output of the model with the changed parameter values with the measured value of vibration of the member;
  g) comparing the recalculated error value with the reference error value;
  h) if the compared recalculated error value is less than the reference error value, setting the recalculated error value as the reference error value, setting the changed parameter values as the model parameters, and repeating the steps c) to h), or
  if the compared recalculated error value is greater than the reference error value, outputting the model parameters;
  generating a new filter using the output model parameters; and
  applying the new filters to respective input signals applied to each transducer to generate vibration within the member to provide the desired haptic sensation.

The filter may have a plurality of coefficients, the number of filter coefficients being equal to the number of model parameters.

The initial estimate of the filter to be applied to a signal input from each transducer, may be an estimate of the required filter. The initial estimate of the filter to be applied to a signal input from each transducer, may be any initial estimate of the filter because the reference error minimisation procedure of the above method and device will determine the required output model parameters. In some examples the initial estimate of the filter may be a standard, or default, filter, or even a random filter. In some examples the initial estimate of the filter may be a close estimate of the required filter. This may provide the advantage of reducing the number of iterations of the method required to arrive at a filter giving acceptable performance.

The above method models the filter in the time domain and apply an iterative refinement algorithm (repeating changing, recalculating and comparing steps), to improve the performance of the filter. The initial filter may be a time-reversal (TR) filter, a simultaneous multi-region (SMR) filter or an infinite impulse response filter. SMR filters obtained analytically are exact in the frequency domain but seldom achieve a good separation in the time domain. In some examples the application of the refinement algorithm may provide double the separation. The model may comprise an inverse of the filter.

The initial filter may be very complex in the temporal domain. However, in the frequency domain there may be one or more key or pole frequencies that are more important than other frequencies across the frequency range of interest. These one or more key or pole frequencies may be transformed into separate initial filter components in the temporal domain. A less complex initial filter may be represented by the combination of these separate initial filter components.

According to a second aspect of the invention, there is provided a method of generating a desired haptic sensation in a device comprising a member and a plurality of transducers mounted to the member, the method comprising:
  choosing a set of frequencies for generating said desired haptic sensation;
  determining an impulse response of a filter for each respective transducer to be applied to a signal input to each transducer, whereby application of the filtered input signals generates vibration of the member which provides the desired haptic sensation;
  calculating the transfer function of each filter, wherein each filter has a transfer function with at least one pole and at least one zero, and calculating the transfer function of each said filter comprises,
    determining at least one pole coefficient which determines at least one pole;
    determining, using said at least one pole coefficient, a pole representation of the transfer function which filters said input signal using said at least one pole;
    using said respective impulse response, calculating at least one zero coefficient which determines at least one zero; and combining said pole representation of the transfer function with said at least one zero coefficient to calculate said transfer function of said filter; and applying the calculated filters to input signals applied to the respective transducers to generate vibration within the member to provide the desired haptic sensation.

The impulse response of each filter may be derived from a measured value of vibration of the member.

The filter may be an infinite impulse response filter and may have a transfer function of the form:

$$Hz(z, d) := \sum_k \left( \frac{d_{k,0} + d_{k,1} \cdot z^{-1} + d_{k,2} \cdot z^{-2}}{1 + a_{k,0} \cdot z^{-1} + a_{k,1} \cdot z^{-2}} \right)$$

Where $d_{k,0}$ $d_{k,1}$ $d_{k,2}$ are zero coefficients which determine the zeros, $a_{k,0}$ $a_{k,1}$ $a_{k,2}$ are pole coefficients which determine the poles and k is the number of poles.

The pole coefficients may be expressed as $$\alpha_{k,0} = -2\,Re(p_k) \text{ and } \alpha_{k,1} = |p_k|^2$$

and the transfer function may be written as $$Hz(z, d) = \sum_k \frac{d_{k,0} + d_{k,1} \cdot z^{-1} + d_{k,2} \cdot z^{-2}}{(1 - p_k \cdot z^{-1}) \cdot (1 - \overline{p_k} \cdot z^{-1})}$$

Determining said pole representation of the transfer function may comprise determining:

$$u_{0,k} := 1 \quad u_{1,k} := -(a_{k,0} \cdot u_{0,k}) \quad u_{i+2,k} := -(a_{k,0} \cdot u_{i+1,k} + a_{k,1} \cdot u_{i,k})$$

The pole coefficients may be determined from the chosen set of frequencies.

If the input signal for each transducer is known, the zero coefficients may be determined from $$z1_{k,j} := \frac{d_{3 \cdot k+1,j} - \sqrt{(d_{3 \cdot k+1,j})^2 - 4 \cdot d_{3 \cdot k,j} \cdot d_{3 \cdot k+2,j}}}{-2 \cdot d_{3 \cdot k,j}}$$

$$z2_{k,j} := \frac{d_{3 \cdot k+1,j} + \sqrt{(d_{3 \cdot k+1,j})^2 - 4 \cdot d_{3 \cdot k,j} \cdot d_{3 \cdot k+2,j}}}{-2 \cdot d_{3 \cdot k,j}}.$$

The method may further comprise calculating zero coefficients for zeros which are not paired with said determined pole coefficients.

According to a third aspect of the invention, there is provided a method of generating a desired haptic sensation in a device comprising a member and a plurality of transducers mounted to the member, the method comprising:

choosing a set of frequencies for generating said desired haptic sensation;

calculating a set of transfer functions of respective filters for each transducer to be applied to a signal input to each transducer, whereby application of the filtered input signals generates vibration of the member which provides the desired haptic sensation;

wherein each filter has a transfer function with at least one pole and at least one zero and calculating the transfer function of each said filter comprises, determining at least one pole coefficient which determines said at least one pole;

determining, using said at least one pole coefficient, a pole representation of the transfer function which filters said input signal using said at least one pole;

using an eigenvector method to determine at least one zero coefficient which determines said at least one zero; and combining said pole representation of the transfer function with said at least one zero coefficient to determine said transfer function for said filter; and applying the determined filters to input signals applied to the respective transducers to generate vibration within the member to provide the desired haptic sensation.

The filter may be an infinite impulse response filter.

The method may further comprise calculating zero coefficients for zeros which are not paired with said determined pole coefficients.

The following features may apply to all aspects.

The initial reference error value may be calculated using a sum squared error, for example from:

$$SSE(a, b, \ldots) = \sum_n |Y(n, a, b, \ldots) - X(n)|^2$$

where X(n) is the measured value which is measured at n test points and Y(n) is the output of a system model where a, b are the model parameter values. The model parameter values may correspond to the filter coefficients.

The SSE is used as an exemplar method for determining a measure of error between a measured value or values and modelled value or values. Other methods such as the variance, standard deviation, mean squared error, root mean square error or other techniques as would be appreciated by the person skilled in the art. The SSE is an example of a suitable method only, the present claimed Method and Device employ any or all of the methods described above, including those appreciated by the person skilled in the art but not explicitly mentioned herein.

The SSE may be minimised by any suitable minimisation routine. A number of known minimisation routines may be used such as Gradient Search or Gradient Decent, Synthetic Annealing, Newton and Quasi-Newton methods, Interior point methods, linear least squares methods (a regression model comprising a linear combination of the parameters), functional analysis methods (approximating to a sum of other functions), non-linear least squares methods (approximate to a linear model and refine the parameters by successive iterations) and other methods that would be appreciated by the skilled person in the art.

A Gradient Search method is described below for the minimisation of the SSE. This is an example of a suitable method only, the present claimed Method and Device may employ any or all of the methods described above, including those appreciated by the person skilled in the art but not explicitly mentioned herein.

Changing the values of the parameters of the model may comprise selecting parameters to reduce the value of SSE by finding the value of t that minimises F(t) where $$F(t) = SSE\left(a + \frac{t \cdot \partial SSE}{\partial a}, b + \frac{t \cdot \partial SSE}{\partial b}, \ldots\right)$$

This means that F(t) can be written as $$F(t) = \sum_n \left| Y\left(n, a + \frac{t \cdot \partial SSE}{\partial a}, b + \frac{t \cdot \partial SSE}{\partial b}, \ldots \right) - X(n) \right|^2$$

Finding the value of t may comprise estimating the vector gradient of error (grad (SSE)), changing all the model parameters proportionally to the estimated vector gradient of error, estimating the first and second derivatives F'(t=0) and F"(t=0) of F(t=0) for the value of t equal to zero and determining t from the estimated derivatives of F(t) where $$grad(SSE) = \left(\frac{\partial SSE}{\partial a}, \frac{\partial SSE}{\partial b}, \ldots \right)^T$$

and $$F'(t) = \frac{\partial F}{\partial t} \text{ and } F''(t) = \frac{\partial^2 F}{\partial t^2}.$$

The derivative D'(x) of a function D(x) may be calculated from $$D'(x) = \lim_{z \to 0} \frac{D(x+z) - D(x)}{z}$$

Estimating the vector gradient of error with respect to each of the parameters may therefore comprise changing each parameter by a small amount, recalculating SSE and estimating the vector gradient of error using the difference between the reference value for SSE and the recalculated value of SSE.

Estimating F'(t)=0 and F"(t)=0 may therefore comprise determining two new parameter sets, the first parameter set being changed proportionally to the estimated vector gradient of error by addition and the second parameter set being changed proportionally to the estimated vector gradient of error by subtraction, calculating SSE values for each of the two new parameter sets and calculating estimates for F'(t)=0 and F"(t)=0 from the new SSE values.

The desired haptic sensation may be a maximum at a first test point and a minimum at a second test point. Alternatively, the desired haptic sensation may be a response which is between the minimum or maximum at a given test position, for example, where the responses at multiple test positions are to be taken into account.

The desired haptic sensation may provide the sensation of a button click to a user. Alternatively, a complex haptic signal (in terms of produced displacement and/or acceleration of the touch sensitive member) may be generated to provide additional information to the user. The haptic feedback signal may be associated with a user action or gesture etc. Alternatively, or additionally, the haptic signal may be associated with the response of the touch-sensitive surface in terms of display action or reaction.

The input (i.e. carrier wave) signal to the filter may be a sine wave at a single frequency. Alternatively, the carrier wave signal may comprise multiple sine waves covering a range of frequencies or may be a swept (chirp), or may be an FM modulated sine wave or a band-limited noise signal, or the carrier may be modulated by band limited noise.

The touch-sensitive screen may be vibrated by applying a signal comprising multiple pulses or a stream of pulses.

The vibration may include any type of vibration, including bending wave vibration, more specifically resonant bending wave vibration.

The vibration exciter may comprise means for applying a bending wave vibration to the screen face. The vibration exciter may be electro-mechanical.

The exciter may be an electromagnetic exciter. Such exciters are well known in the art e.g. from WO97/09859, WO98/34320 and WO99/13684, belonging to the applicant and incorporated herein by reference. Alternatively, the exciter may be a piezoelectric transducer, a magneto-strictive exciter or a bender or torsional transducer (e.g. of the type taught in WO 00/13464). The exciter may be a distributed mode actuator, as described in WO01/54450, incorporated herein by reference. A plurality of exciters (perhaps of different types) may be selected to operate in a co-ordinated fashion. The, or each, exciter may be inertial.

The touch surface may be a panel-form member which is a bending wave device, for example, a resonant bending wave device. The touch screen may also be a loudspeaker wherein a second vibration exciter excites vibration which produces an acoustic output. Alternatively, one of the exciters used to provide haptic feedback may also be used to provide an audio signal to drive the touch screen as a loudspeaker. For example, the touch screen may be a resonant bending wave mode loudspeaker as described in International Patent Application WO97/09842 which is incorporated by reference.

Contact on the surface may be detected and/or tracked as described in International patent applications WO 01/48684, WO 03/005292 and/or WO 04/053781 to the present applicant. These International patent applications are here incorporated by reference. Alternatively, other known methods may be used to receive and record or sense such contacts.

According to a fourth aspect of the invention, there is provided a device comprising
 a member,
 a plurality of transducers mounted to the member, and
 a processor configured to carry out the method of any one of the preceding aspects.

According to a fifth aspect of the invention, there is provided a computer program comprising program code which, when executed on a processor of a device, will cause the device to carry out the method of any one of the first to third aspects.

The invention further provides processor control code to implement the above-described methods, in particular on a data carrier such as a disk, CD- or DVD-ROM, programmed memory such as read-only memory (firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very High speed integrated circuit Hardware Description Language). As the skilled person will appreciate such code and/or data may be distributed between a plurality of coupled components in communication with one another.

BRIEF DESCRIPTION OF DRAWINGS

The invention is diagrammatically illustrated, by way of example, in the accompanying drawings in which:—

FIG. 2c is a graph of signal level (dB) against time for the filtered response of FIG. 2a;

FIG. 2d is a graph of signal level (dB) against time for the filtered response of FIG. 2a;

FIGS. 6a to 6d show the impulse response as it varies with time for each of the signal of FIG. 5a;

DETAILED DESCRIPTION OF DRAWINGS

Figure 1A:
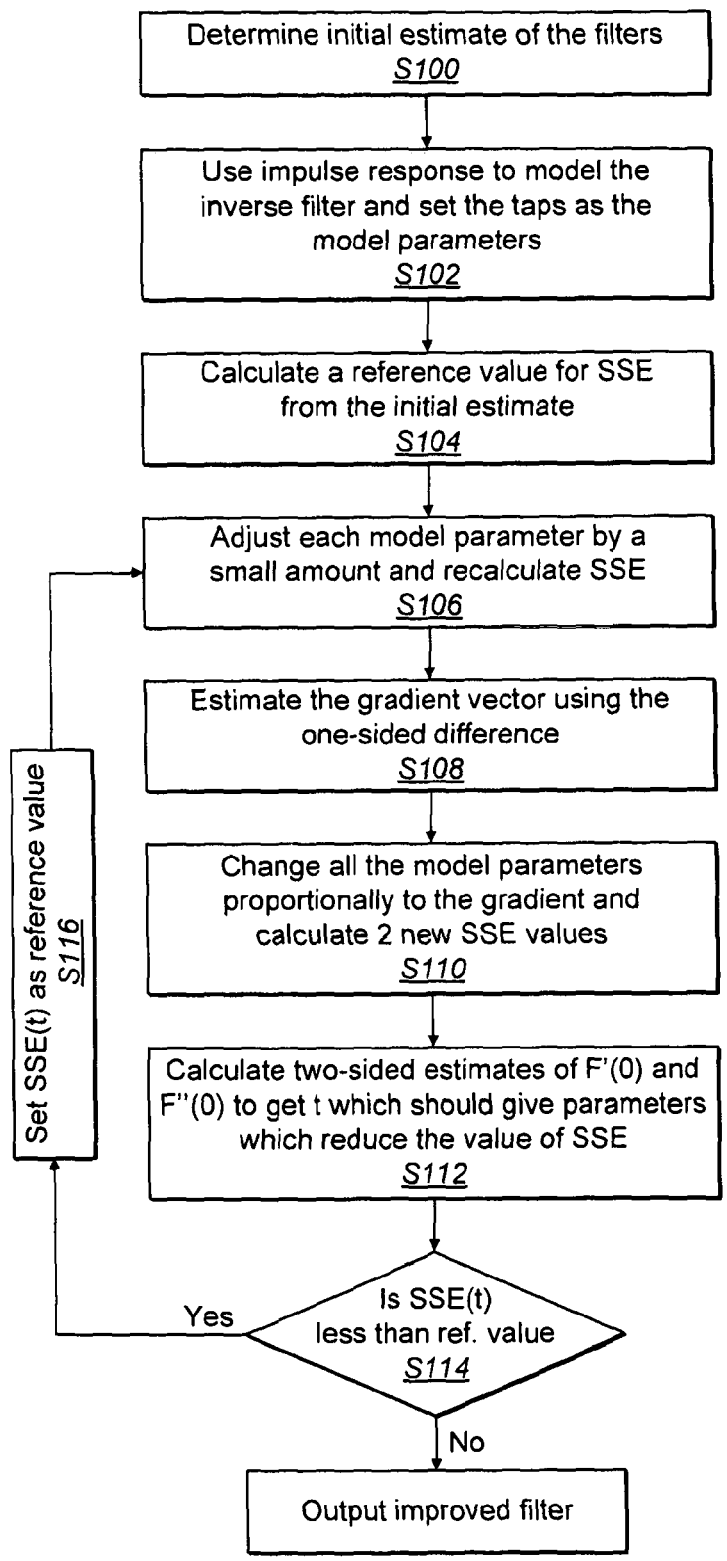
FIG. 1a is a flowchart showing the steps for improving an estimate for a filter.

FIG. 1. shows a flow diagram of a first example of a method used to create an improved filter. This method involves minimising a Summed Squared Error (SSE) value, with the SSE being used as in example only. FIG. 1. Shows use of the gradient Search method for the minimisation of SSE, but this is used as an exemplar method only.

FIG. 1 shows the steps of a first method used to create an improved filter. The filter may be a simultaneous multi-region filter (SMR) filter or a time-reversed filter (TR) filter created as described in co-pending International application PCT/GB2010/050540 (the entire contents of which are incorporated herein by reference). The first step S100 is to create an initial estimate of the filter to be applied to a signal input to each transducer whereby application of the filtered input signal generates vibration of the member which provides a haptic sensation. The output time response for the filter is the convolution of the input signal and the time impulse response of the filter.

The vibration of the member is considered as the output of a system model Y(n, a, b, . . . ) where a, b are the model parameters (there may be m parameters) and n is the number of test points at which the real output X(n) is measured. Thus, as recorded at step S102, the model is created using the model parameters, corresponding to the taps, i.e. the coefficients on the digital filter. As discussed above the coefficients of the filter may correspond to the model parameters. The system model may comprise an inverse of the filter. The initial estimate of the filter may be used to create the model.

The next step is to measure the effectiveness of the model by using the sum-squared error (SSE) which is defined as the energy of the difference between the model and the real system. This is calculated from $$SSE(a, b, \dots) = \sum_n |Y(n, a, b, \dots) - X(n)|^2$$

In other words the difference between the model output and the real output at each test point is calculated, each difference is squared and the squared differences are summed together. The real output may be determined by measurement. For example, using contact methods such as using a stylus in contact with the touch sensitive member to measure the vibration of the member and/or other contact methods as would be appreciated by a person skilled in the art. Alternatively or additionally the real output may be determined using non-contact methods such as using a laser vibration system or techniques or methods to measure the vibration of the member and or other non-contact methods, systems or techniques as would be appreciated by a person skilled in the art.

At step S104, a value for SSE is calculated that is termed the reference SSE value (or reference value for SSE). The reference value for SSE is calculated making use of the initial filter estimate. This means that the reference value for SSE may be calculated for the output of the model by comparing the output of the model with a measured value of vibration of the member.

At step S106, the parameters of the model are changed in order to obtain a modelled output that tends towards the real output. This means that the parameters of the model are changed in order that the calculated vibration of the member tends towards the measured vibration of the member. Accordingly, each model parameter (that may correspond to each tap or coefficient of the filter) is adjusted by a small amount (i.e. by less than 10%, preferably less than 1%) and a new value for SSE is calculated.

In order to obtain a model output that tends towards the real output the aim or requirement is to minimise the SSE value. The SSE may be minimised by any suitable minimisation routine. Using a Gradient Search method, minimisation of SSE is achieved by setting the gradient to zero or substantially close to zero.

For a model containing m parameters, there are m gradient equations. Thus at step S108, the vector gradient of error is calculated with respect to each of the parameters using $$grad(SSE) = \left(\frac{\partial SSE}{\partial a}, \frac{\partial SSE}{\partial b}, \dots\right)^T$$

The vector gradient represents the magnitude and direction of the slope of the error function, which in this example is the SSE.

At step S110, two new models are created by changing the model parameters by a value which is proportional to the calculated vector gradient. One model output is determined by adding the value to each of the model parameters and calculating a model output and the second model output is determined by subtracting this value from each of the model parameters and calculating a model output. Using these two model outputs, two new SSEs are calculated; one called SSE_p (from the new model where the value is added to model parameters) and one called SSE_m (from the new model where the value is subtracted from model parameters).

The next step S112 is to obtain a set of parameters which aims to reduce the value of SSE. Using a Gradient Search method, the value of SSE may be minimised by attempting to find the value of t that minimises F(t), where F(t) is defined as:

$$F(t) = SSE\left(a + \frac{t \cdot \partial SSE}{\partial a}, b + \frac{t \cdot \partial SSE}{\partial b}, \ldots\right)$$

At the value of t where F(t) is minimised, the gradient of F is zero, i.e. for F(t) the derivative, F'(t)=0. The Newton-Raphson method is used to solve for t, starting with $t_0$=0. Other equivalent known methods may be used to solve for t.

For the Newton Raphson method a new value for t ($t_{k+1}$) can be calculated from a present or start value for t ($t_k$) from $$t_{k+1} = t_k - F'(t_k)/F''(t_k), \text{ where}$$

$$F'(t) = \frac{\partial F}{\partial t} \text{ and } F''(t) = \frac{\partial^2 F}{\partial t^2}$$

Starting with t=0, a first solution is $$t = \frac{F'(0)}{F''(0)}$$

The first and second derivatives of F(t) may be found using finite difference methods. Two-sided estimates of F'(0) and F''(0) are used to determine t, using the standard equations:

$$\frac{df(x)}{dx} \sim \frac{f(x+dx) - f(x-dx)}{2dx} \text{ and}$$

$$\frac{d^2 f(x)}{dx^2} \sim \frac{f(x+dx) + f(x-dx) - 2f(x)}{dx^2}$$

Once a value for t is calculated, this is used to generate a new set of model parameters and hence a new SSE value. If this value is less than the reference value calculated in step S104, the new SSE value is set as the reference value (step S116) and steps S106 to S112 are repeated. If this new value is greater than the reference value (either the value calculated in step S104 or a previous value of SSE calculated using steps S106 to S110), the model parameters for the improved filter are output. If the new value is greater than the reference value, then no further improvement can be achieved by this methodology and an optimum solution has been achieved by the previous set of model parameter values.

Figure 1B:
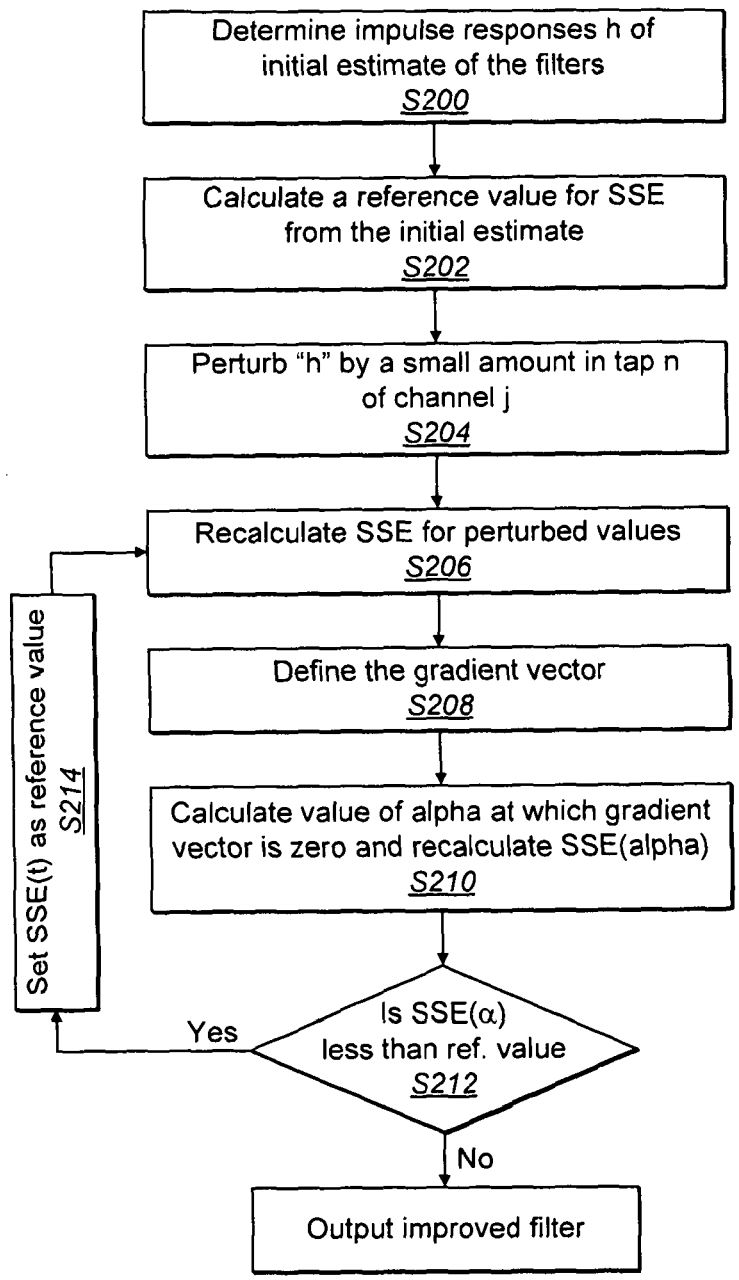
FIG. 1b is a flowchart showing the steps for an alternative method of improving an estimate for a filter.

FIG. 1b shows an alternative iterative method for calculating an improved filter. The filter may be a simultaneous multi-region filter (SMR) filter or a time-reversed filter (TR) filter. The method may show computational efficiencies as only one parameter of the model need be varied within a calculation step. Consider the general situation where we have the multi-channel impulse responses measured at two target locations, Q is desired to be "quiet" and L is desired to be loud.

At step S200, we define a set of filter impulse responses, h, which represent an estimate of the filters needed to achieve the separation of the Q and L target sensations. These may be an estimate of the simultaneous multi-region filter (SMR) filter or time-reversed filter (TR) filter.

At step S202, we calculate a reference value to be used in calculating an improved filter, using the sum over all channels of the convolution product of the filter impulse response at each channel and the response measured for that channel at the quiet location and the sum over all channels of the convolution product of the filter impulse response at each channel and the response measured for that channel at the loud location. The reference value is termed SSE. Thus the reference value for SSE is $$SSE = \frac{\left|\sum_{chan} Q_{chan} * h_{chan}\right|^2}{\left|\sum_{chan} L_{chan} * h_{chan}\right|^2}$$

where the star signifies the convolution product, $Q_{chan}$ the measured value at the quiet location, and $L_{chan}$ is the measured value at the loud location.

At step S204, we "perturb" the set of filter impulse responses h by adjusting a tap (i.e. a digital coefficient) by a small amount α in only one filter channel j. So $$h1 = h, \text{chan} \neq j, h1 = h + \alpha \cdot \delta(t - n \cdot T), \text{chan} = j, T = \text{sample period}$$

where δ is the delta (sampling) function and where $$\delta(x) = 1 \text{ if } x = 0, 0 \text{ otherwise}$$

At step S206, we calculate a new value for SSE for the perturbed value from:

$$SSE(\alpha) = \frac{\left|\sum_{chan} Q_{chan} * (h_{chan} + \alpha \cdot \delta_{chan,j} \cdot z^{-n} \cdot \delta(0))\right|^2}{\left|\sum_{chan} L_{chan} * (h_{chan} + \alpha \cdot \delta_{chan,j} \cdot z^{-n} \cdot \delta(0))\right|^2}$$

Where z is the unit delay operator
$\delta_{i,j}$ is the Kronecker delta which is 1 if i=j, and 0 otherwise (i.e a discrete version of the delta function)

At step S206, we define the gradient vector exactly as follows;

Now as the numerator and denominator for SSE(α) are identical in form, lets consider just one term for now.

$$\text{term}(\alpha) = \left|\sum_{chan} R_{chan} * (h_{chan} + \alpha \cdot \delta_{chan,j} \cdot z^{-n} \cdot \delta(0))\right|^2$$

Where R represents either Q or L.

Expanding this explicitly, assuming that the second order term is vanishingly small will give:

$$\text{term}(\alpha) = \sum_{chan1} R_{chan1} * (h_{chan1} + \alpha \cdot \delta_{chan1,j} \cdot z^{-n} \cdot \delta(0)) \cdot$$

$$\sum_{chan2} R_{chan2} * (h_{chan2} + \alpha \cdot \delta_{chan2,j} \cdot z^{-n} \cdot \delta(0))$$

Using this result, we may define the exact gradient of SSE as follows;

$$grad(SSE)_{n,j} = \lim\left(\frac{SSE(\alpha) - SSE}{\alpha}\right)$$

$$grad(SSE)_{n,j} = \frac{2}{\left|\sum_{chan} L_{chan} * h_{chan}\right|^2} \cdot$$

$$\left(\left(z^{-n} \cdot Q_j\right) \cdot \left(\sum_{chan} Q_{chan} * h_{chan}\right) - SSE \cdot (z^{-n} \cdot L_j) \cdot \left(\sum_{chan} L_{chan} * h_{chan}\right)\right)$$

Now we have only 2 convolutions and some shifts and dot products, and the result is exact. Thus at Step S210 we calculate the value at which the gradient vector and follow the same final steps as in the previously described method.

Figure 2A:
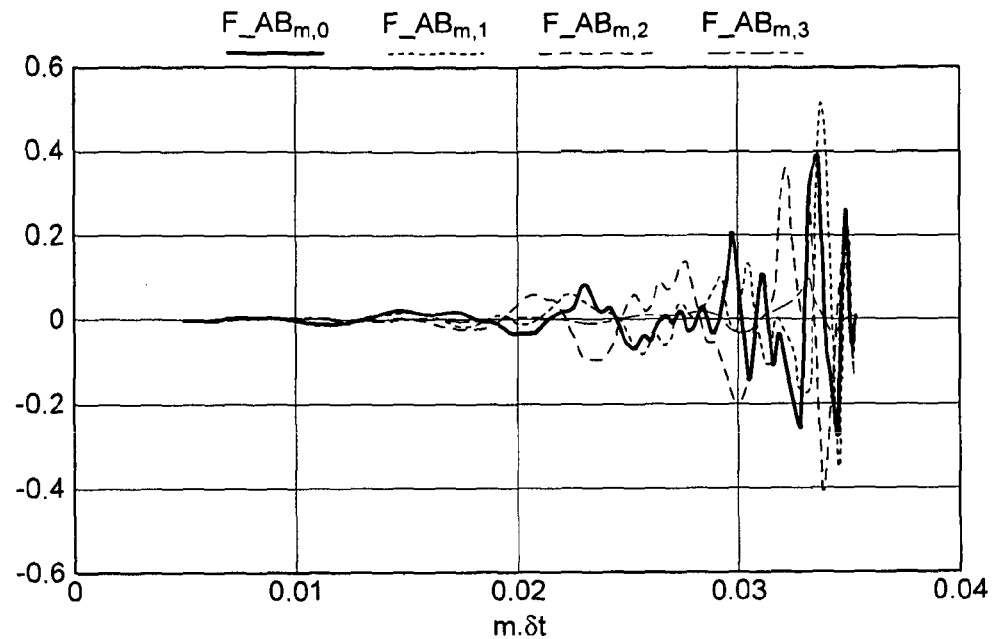
FIG. 2a is a graph showing the initial filter set varying against time.
Figure 2B:
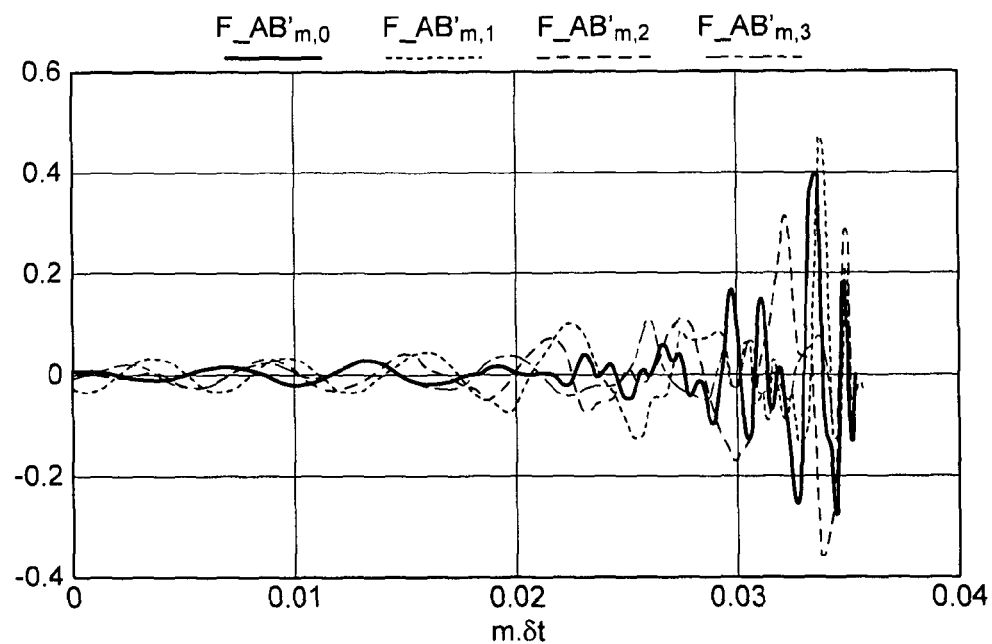
FIG. 2b is a graph of time variation of the filter set of FIG. 2a after iteration according to the method shown in FIG. 1.
Figure 2C:
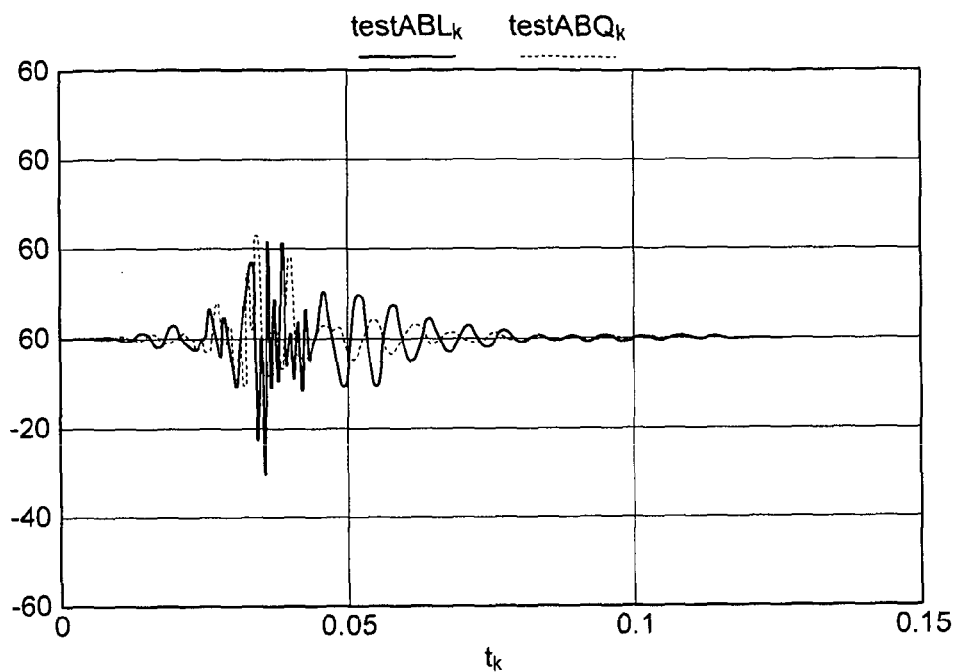

FIGS. 2a to 2d show the method of FIG. 1 applied to a specific example, namely a TR filter (see FIGS. 4 to 8). The TR filter produces a simultaneous minimum and maximum, the said Quiet and Loud signals, at two separate points for a touch sensitive device having four transducers in this specific example, however as appreciated by the person skilled in the art the claimed method and device may operate with other numbers of transducers, such as 2 or more transducers. FIG. 2a shows the filter for each of the four transducers which is essentially a time-reversed impulse response. FIG. 2c shows the output time response of the filters of FIG. 2a (i.e. shows the convolution of the impulse responses of the filter with the input signals). The maximum signal is shown as testABL$_k$ and the minimum signal as testABQ$_k$. The SSE for this filter set is −2.6 dB which is better than creating a filter at random but not significantly so.

Figure 2D:
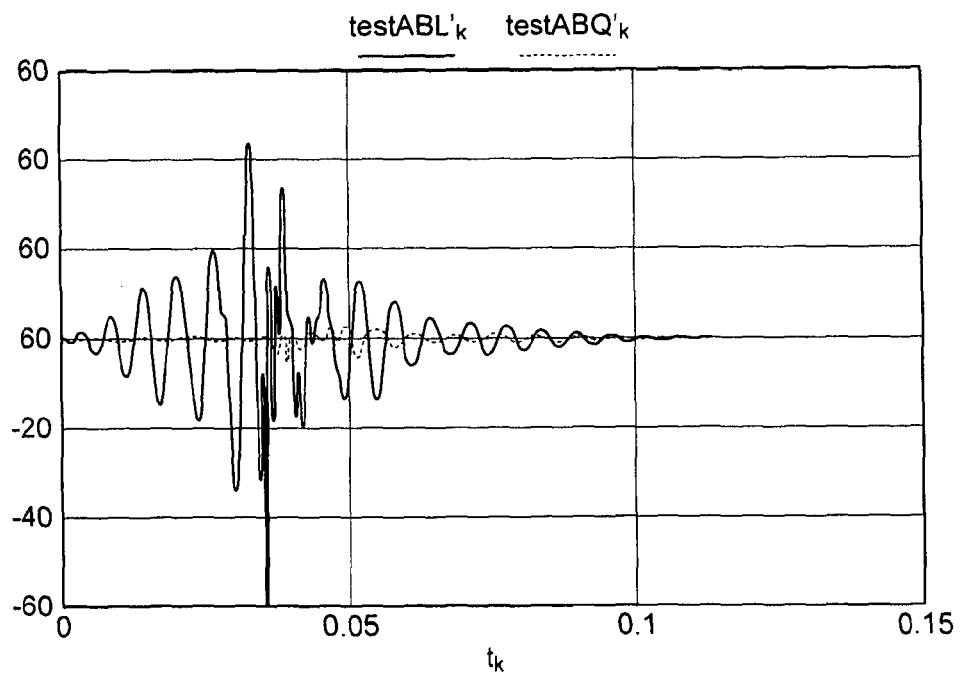

FIG. 2b shows the filter for each of the four transducers after application of ten iterations of the optimisation method of FIG. 1. FIG. 2d shows the output time response of the filters of FIG. 2c. The SSE for this filter set is −17.9 dB. This translates in to a clearly visible difference between the maximum output of the maximum signal (testABL$_k$) and the maximum output of the minimum signal (testABQ$_k$). The difference is considerably greater than the same difference for the original filters and renders the optimised filters effective whereas the original filters were not very effective.

Figure 3A:
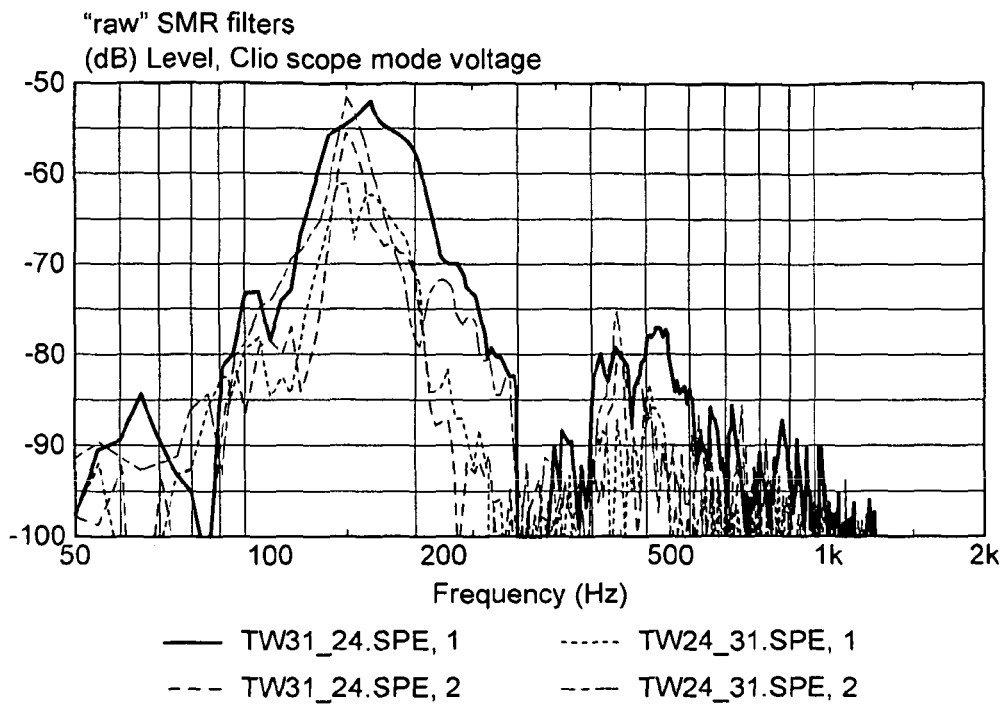
FIG. 3a is a graph of signal level (dB) against frequency for a second initial filter set.
Figure 3B:
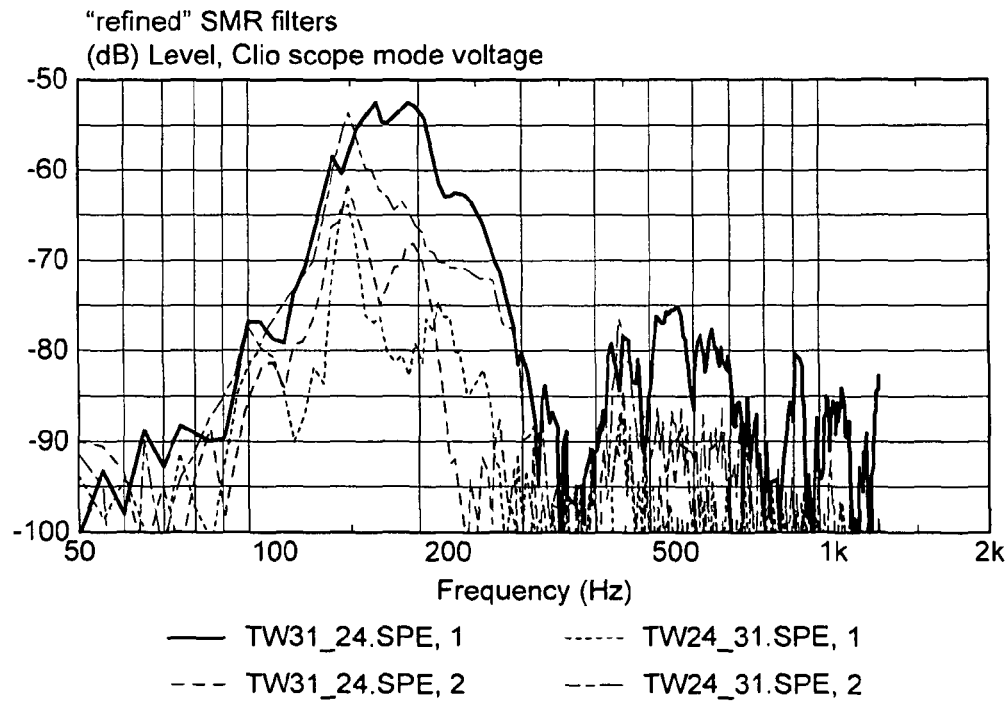
FIG. 3b is a graph of signal level (dB) against frequency for the filter set of FIG. 3a after iteration according to the method shown in FIG. 1.

FIGS. 3a and 3b show the application of the optimisation method of FIG. 1 to an SMR filter which has been obtained analytically using the eigenvector method. These show two traces for member vibration signals at the loud position and two traces for member vibration signals at the quiet position, both before and after application of the optimisation method.

One set of filters is created for a net-book portable computer with a touch-screen by dividing the touch screen into a grid having three rows and five columns. Measurements are taken at the "2,2" target (i.e. second row, second column) and the "3,1" target to generate two sets of SMR filters with the goal of minimising the response at one target and maximising it at the other. The haptic signals resulting from applying the calculated filters to an input signal were measured and are shown in FIG. 3a. For both filter sets, the intendedly loud signals (50, 52) are stronger than the intendedly quiet signals (60, 62). However, at some frequencies the difference is less than desired. Moreover, such SMR filters are exact in the frequency domain but seldom achieve a theoretical separation better than 20 dB in the time-domain. This can be improved somewhat by improving the frequency resolution of the measurement data and by adjusting the delay of the filters. However, there still seems to be a fundamental limit to the effectiveness of the filters in the time-domain. One explanation may be the Heisenberg uncertainty relationship between frequency and time means that without an infinitely long filter and an infinitely fine frequency resolution, the time-domain filters obtained this way will never be exact.

FIG. 3b shows the result of iteratively refining the initial filter set according to the method of FIG. 1. In real use, the filters still have to contend with system non-linearity and time variation but the measured responses still show a very useful improvement in performance. The haptic signals resulting from applying the optimised filters to an input signal were measured and are shown in FIG. 3b. The separation between loud and quiet is more marked with the refined filter set than with the original set. The refinement process has effectively doubled the dB separation of the analytically derived filters. In real use, the filters still have to contend with system non-linearity and time variation but the measured responses still show a very useful improvement in performance.

Moreover, it can be shown that the process makes empirically derived SMR filters effective.

The "exact" solutions, i.e. the analytically calculated SMR filters, result in filter delays of about $\frac{1}{10}^{th}$ of the delays from the time-reversal solution and may be preferable. Time reversal filters may intrinsically incur temporal delays, as shown in FIG. 2a.

FIGS. 4 to 7b illustrate one method for creating an initial filter set, in this case using a time-reversed impulse response. As explained in more detail below, time-reversed impulse response (TR) shows how to create a single maximum. With a minimum amount of effort, it can also give a single minimum. To get simultaneously min and max at different locations would probably use the minimising set, and could either rely on there being some signal at the other location, or require extra "empirical" combining of the minimising and maximising filters. Thus, it is possible to empirically derive an SMR using the TR process. The method of improving the filter set described in relation to FIGS. 1 to 3b could be used in relation to any filter set, including conceptually a blind guess. However, the better the initial estimate, the better the result.

Figure 4:
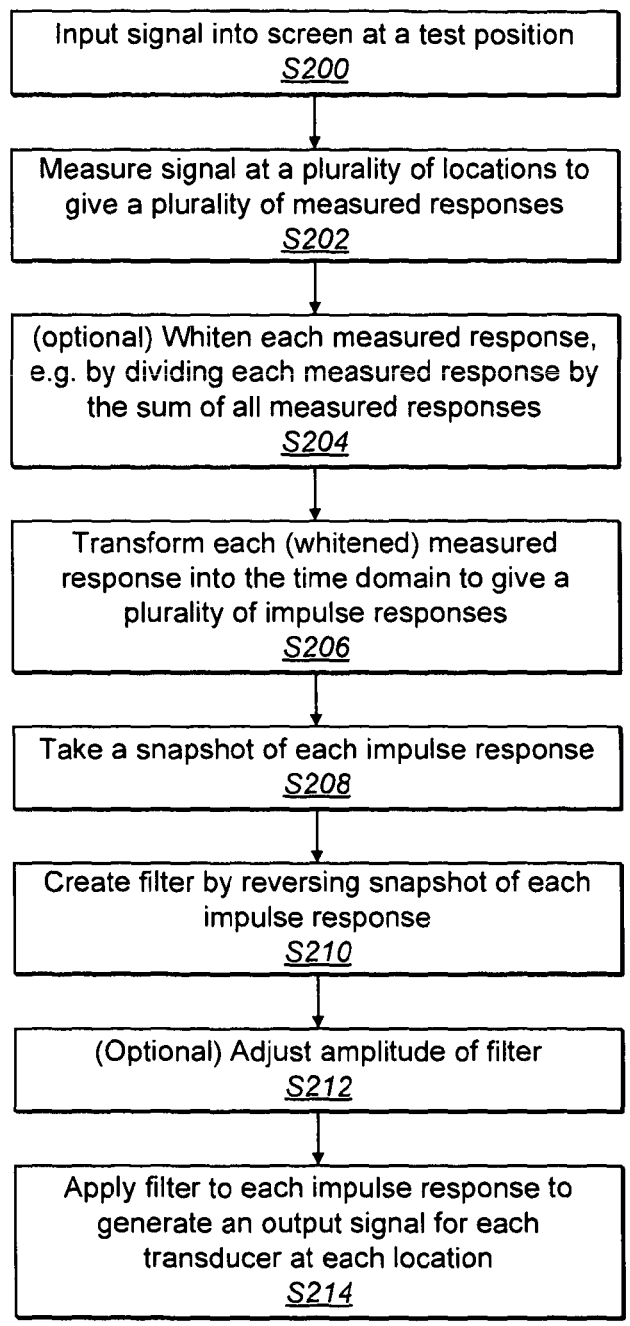
FIG. 4 is a flowchart showing the steps for creating an initial filter set.

As shown in FIG. 4, the first step S200 in creating a filter set is to input a signal into the screen at a test positions and to measure this input signal at a plurality of locations (S202). As explained with reference to FIG. 5a, each measured response is optionally whitened (S204) and then transformed into the time domain (S206). As explained in FIGS. 6a to 6d, the filter is formed by taking a snapshot of each impulse response (S208) and reversing this snapshot (S210).

The spectrum of the time-reversed signal is the complex conjugate of the original original: $x(t) \rightarrow X(f)$ filter: $y(t) = x(-t); Y(f) = \text{conj}(X(f))$ This is approximated by adding a fixed delay, so $z(t) = x(T-t)$ if $t <= T$, or $z(t) = 0$ if $t > T$ When the filter is applied to the signal (ignoring the approximation for now), the phase information is removed, but the amplitude information is reinforced.

$y(t) * x(t) \rightarrow X(f) \times Y(f) = |X(f)|^2$ (In fact, the resulting time response is the autocorrelation function).

Figure 5A:
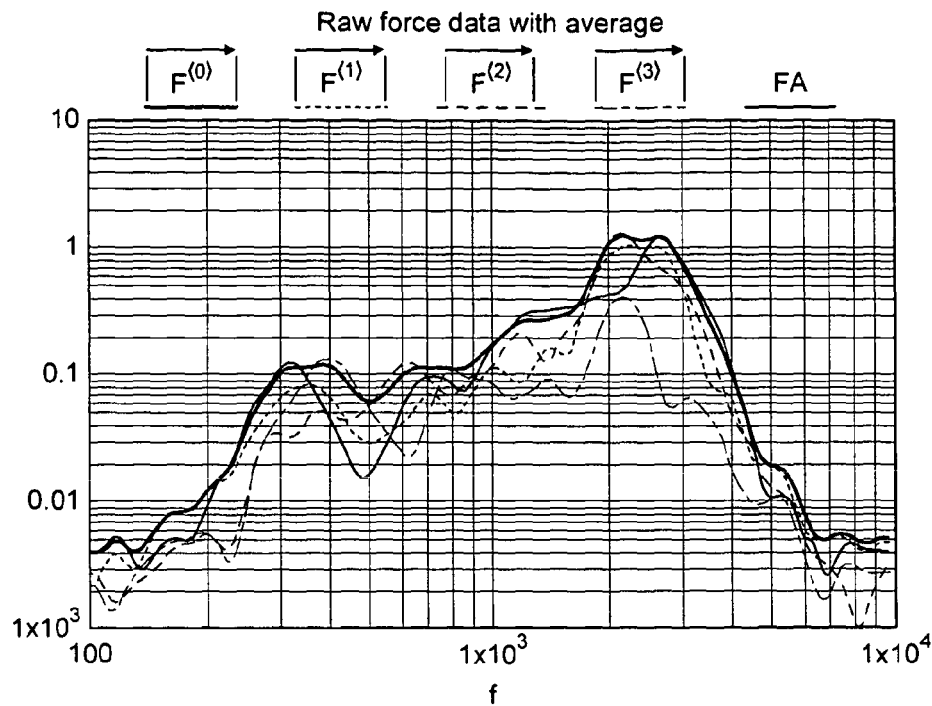
FIG. 5a shows a log-log plot of |force| vs frequency for each channel F and the arithmetic sum FA.
Figure 5B:
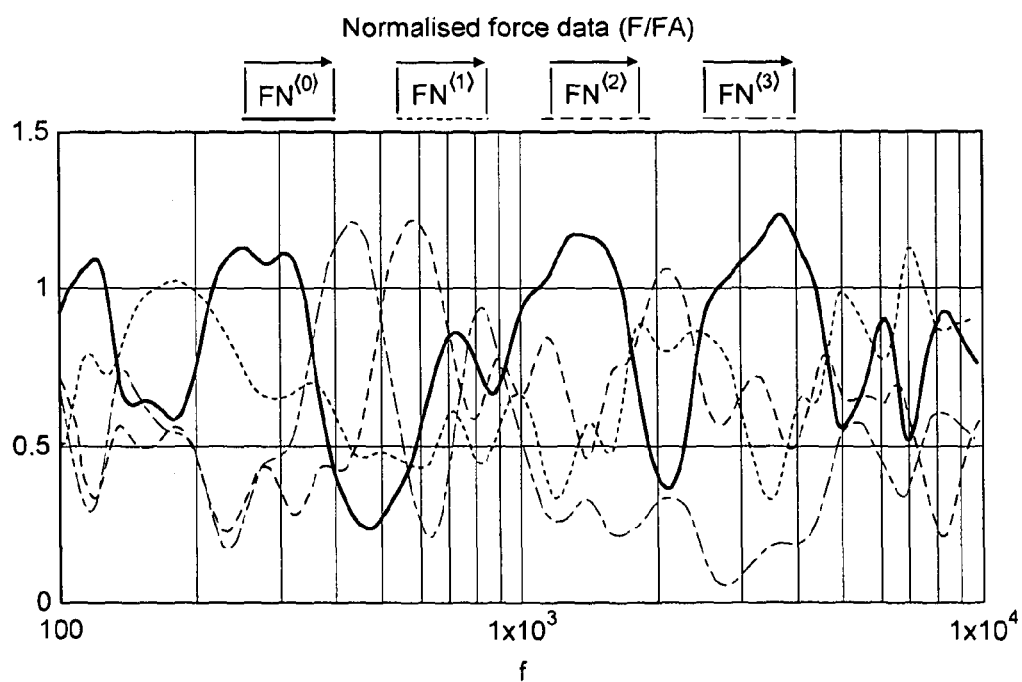
FIG. 5b shows a log-lin plot of each channel of FIG. 5a divided by FA (i.e. normalised)
Figure 6A:
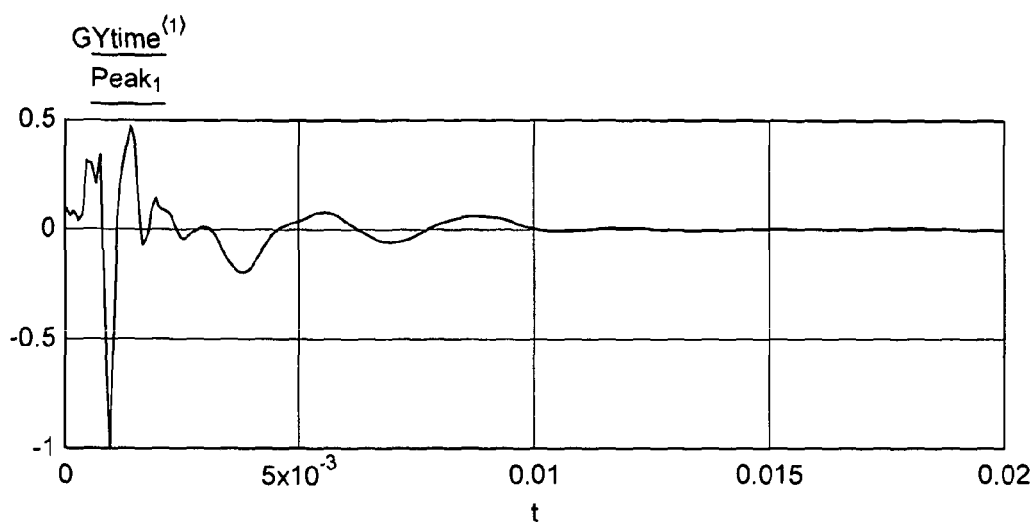
Figure 6B:
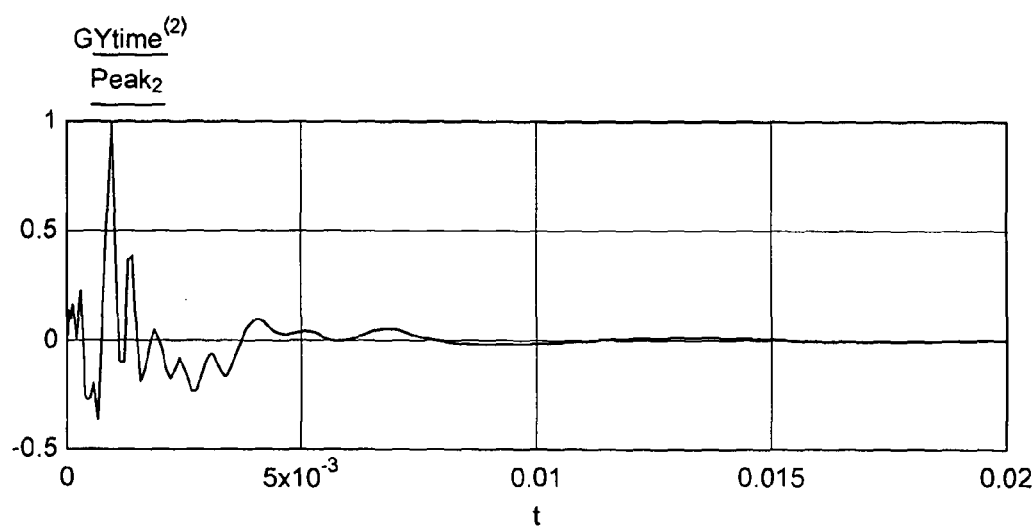
Figure 6C:
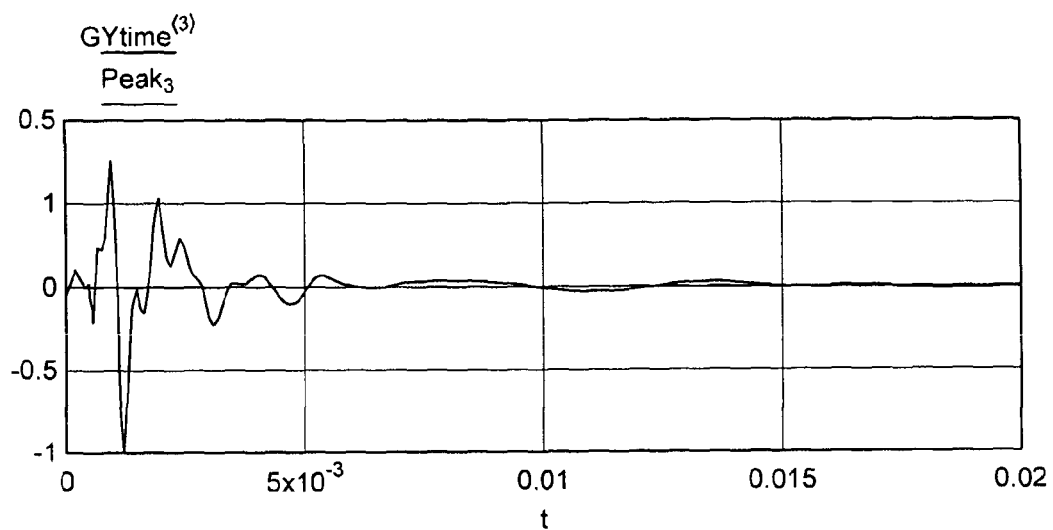
Figure 6D:
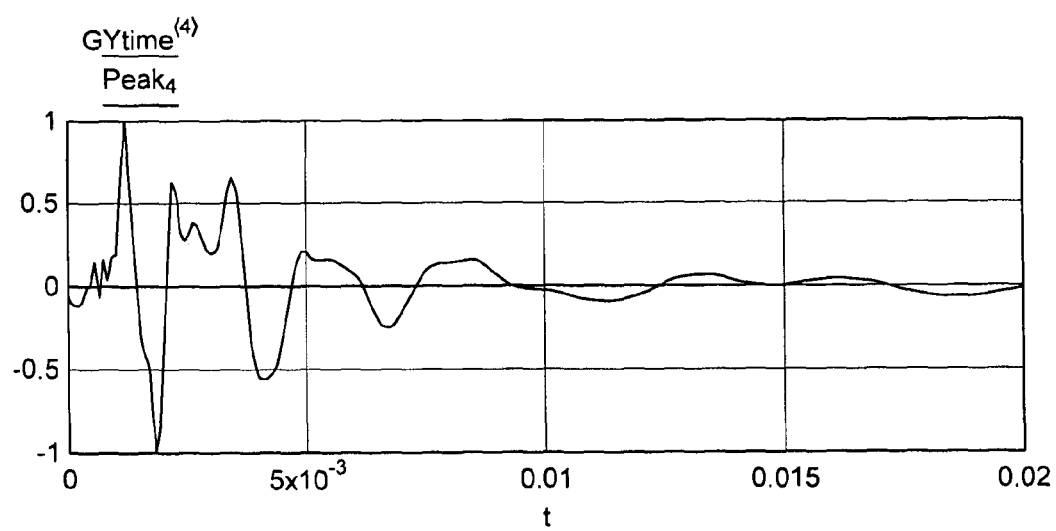

FIG. 5a is a log-log plot of |force| vs frequency for each channel (F) (i.e. for four haptics-input vibration transducers) and the arithmetic sum (FA) of these four forces. FIG. 5b is a log-lin plot of each of the 4 channel responses divided by FA (FN), i.e. normalised. Dividing each response by FA renders them more spectrally white, which improves the effectiveness of the method. This is because the amplitude response is squared in the filtering process and thus it is beneficial if the signal is spectrally "white", or flat.

FIGS. 6a to 6d show each of the four normalised responses transformed into the time domain to give the individual impulse responses (GYtime$^{<i>}$). These impulse responses have also been normalised by dividing by the peak for each response.

Figure 7A:
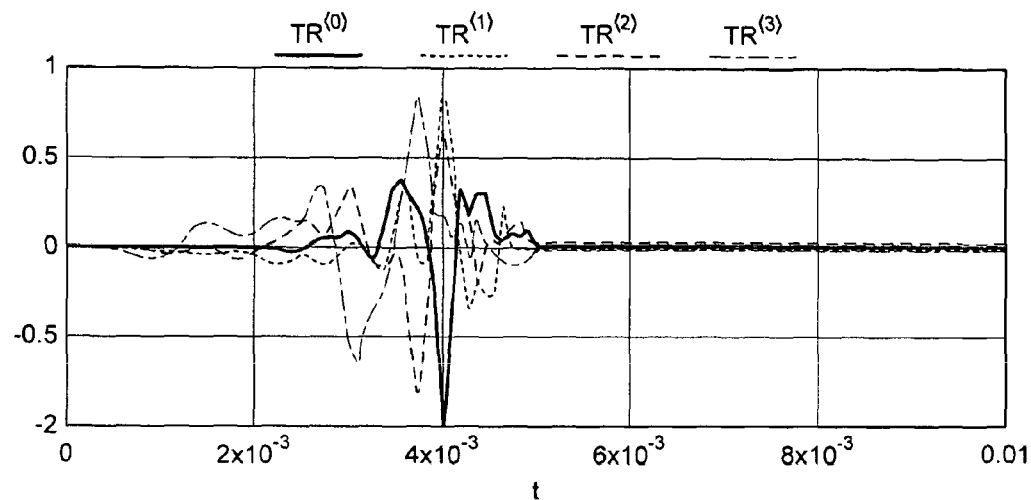
FIG. 7a shows the time reversal filters for each of FIGS. 6a to 6d.

The time reversal filters, TR, are formed by taking a finite snapshot of the impulse responses of FIGS. 6a to 6d and then reversing them in time. The TR have built into them a delay equal to the length of the sample, as shown in FIG. 2a. FIG. 7a shows the time reveral filter for each channel (0, 1, 2 and 3)

$$TR_{k,j} := \frac{\text{if } (k \geq k\max, 0, GYtime_{k\max-k-1,j+1} \cdot win_{k\max-k-1})}{peak_{j+1}}$$

where kmax=samples (length)

Figure 7B:
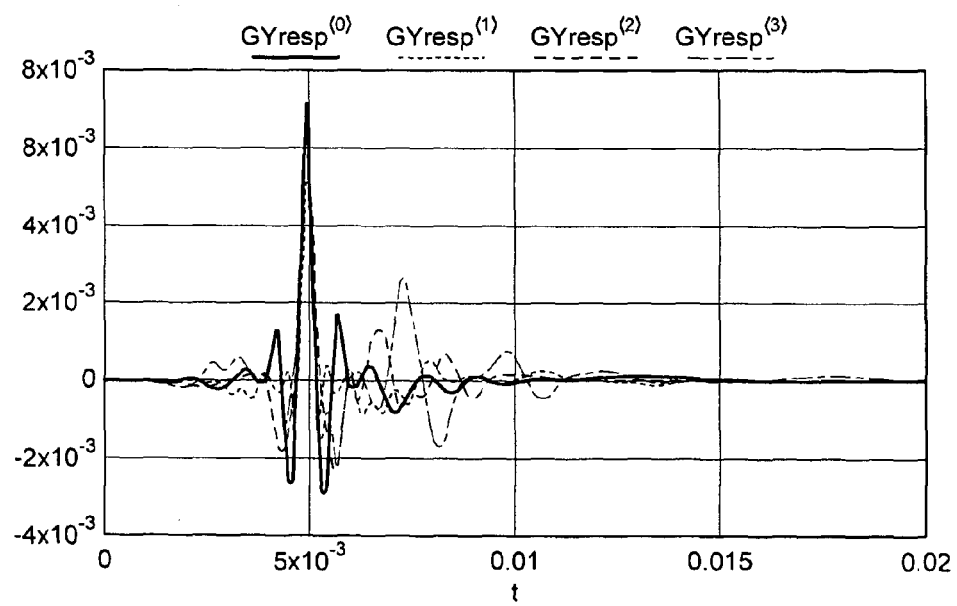
FIG. 7b shows the time reversal filters of FIG. 7a convolved with each respective signal of FIGS. 6a to 6d.

FIG. 7b shows the results of convolved the filters with the appropriate impulse responses in the time domain (GYtime) to give the filtered response GYresp. The convolution is expressed as:

$$GY_{resp_{k,j}} := \sum_{i=0}^{k} (GYtime_{k-i,j+1} \cdot TR_{i,j}) \; amp_j : \max(GYresp^{(j)})$$

As shown in FIG. 7b, all the responses share a common maximum, but exhibit some ringing. The common maximum occurs because the phase/time information has been corrected. The ringing occurs because the amplitude information is exaggerated.

As shown at step S212 in FIG. 4, the filter amplitudes may be adjusted to maximise or minimise the sum of the four signals at the touch location. The filter is then applied to each impulse response to generate an output signal to be applied at each location (S214).

Figure 8:
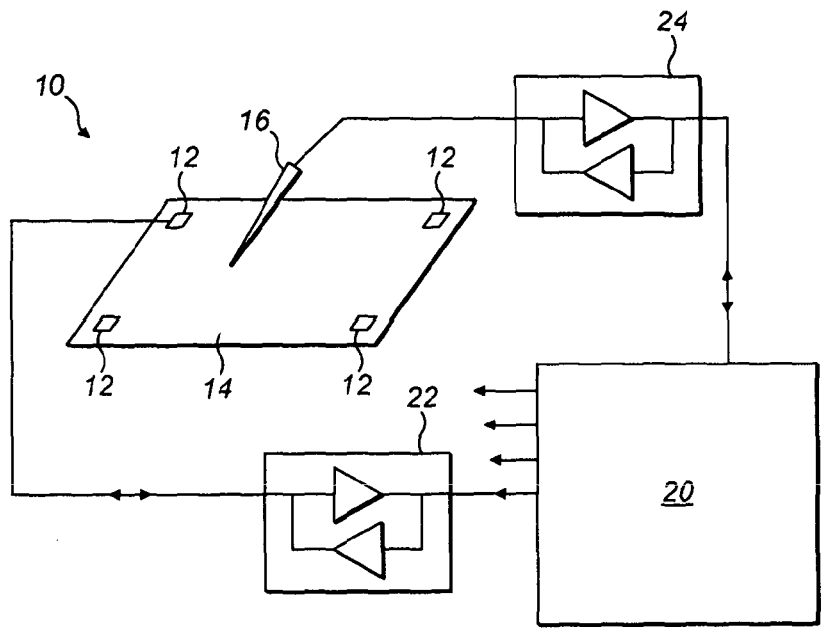
FIG. 8 is a schematic illustration of a touch sensitive device.

FIG. 8 shows a touch-sensitive haptics device 10 with four haptics-input vibration transducers 12 mounted to a touch-sensitive screen 14 (in this specific example there are four transducers, however as appreciated by the person skilled in the art there may be any number of input transducers on the screen). The transducers 12 are each coupled to a system processor 20 via a two-way amplifier 22. A stylus 16 is also connected to the processor 20 via a two-way amplifier 24.

The touch-sensitive device shown in FIG. 8 may be used to create an initial filter set as set out in FIG. 4 and may then be used to apply the improved filter set created as described in FIG. 1. The device has two operational modes, normal use and training mode. In normal use, i.e. when a user is using the screen 14 of the touch-sensitive device 10, the transducers 12 produce the required localized haptic force feedback in response to detected touches on the surface. The method of producing the haptic feedback is not critical to the operation of the device and may be as described in any known techniques. The haptic sensation may be a click to simulate the feel of pressing a button or may be more complex to simulate other sensations, i.e. associated with sliding movements, increasing/decreasing intensity of feeling etc. The more complex sensations may be associated with gestures such as sliding, pitching or rotating fingers on the screen.

In training mode, the stylus 16 is used to inject vibrational signals at specified test points; thus the stylus 16 may be considered to be a "force pencil". The transducers 12 are used as sensors to detect these input signals. The transducers are thus reciprocal transducers able to work as both output devices to generate excitation signals which create vibration in the screen and as input devices to sense vibration in the screen and convert the vibration into signals to be analysed. It is preferable for all the transducer to be reciprocal devices but it is possible to have a device in which not all transducers are reciprocal; such a device is more complicated.

The system processor 20 generates the signals which are sent to the stylus 16 via the two-way amplifier 24 and receives the signals from the transducers 12. The two-way amplifiers 22 are also connected between the system processor 20 and each transducer 12; one amplifier for each channel, i.e. one amplifier for each transducer. The stylus 16 is also arranged to sense haptic feedback signals in the screen originating from the transducers 12 and to feed the sensed signals to the processor 20 via the two-way amplifier 24.

FIGS. 9a to 10b illustrate an alternative method for creating an initial filter set, in this case a simultaneous multi-region filter (SMR) having a maximum response at one location on the touch sensitive screen and a minimum response at another discrete location on the screen. Four transducers are used in the filter so there are four channels with j:=0 . . . chan-1. In this specific example there are four transducers, however as appreciated by the person skilled in the art the claimed method and device may operate with 2 or more transducers.

The alternative method for creating an initial filter set may be carried in two ways.

A first way may be used when the filter impulse response is known. This means that the required theoretical filter impulse response to give the desired member vibration output may be known, It will be understood that even if the desired impulse response is known, the implementation of the required filter in practice may be difficult, as will be appreciated by the person skilled in the art. The solution may be to make use of Quiet and Loud measurements on the member or panel, and a generalised inverse matrix technique (also known as the Moore-Penrose technique) may be used to determine recursive filters, the output from which may be used to provide a filtered impulse response tending towards the required theoretical impulse response to give the desired haptics response.

The second way may be used even when the filter impulse response is not known. The solution may be to use to make use of Quiet and Loud measurements on the member or panel, and a solving an eigenvalue problem may be used to determine recursive filters, the output from which may be used to provide a filtered impulse response tending towards the required theoretical impulse response to give the desired vibration output.

The two ways of creating an initial filter set using an alternative method have a number of common steps, before the generalised inverse matrix technique or solution of an eigenvalue problem are undertaken.

It should be understood that although the terms quiet and loud are used to refer to locations having relatively less and more movement producing a desired haptic sensation, this wording is used only to assist understanding. It is not necessary that the movement is such as to produce an audible sound.

Figure 9A:
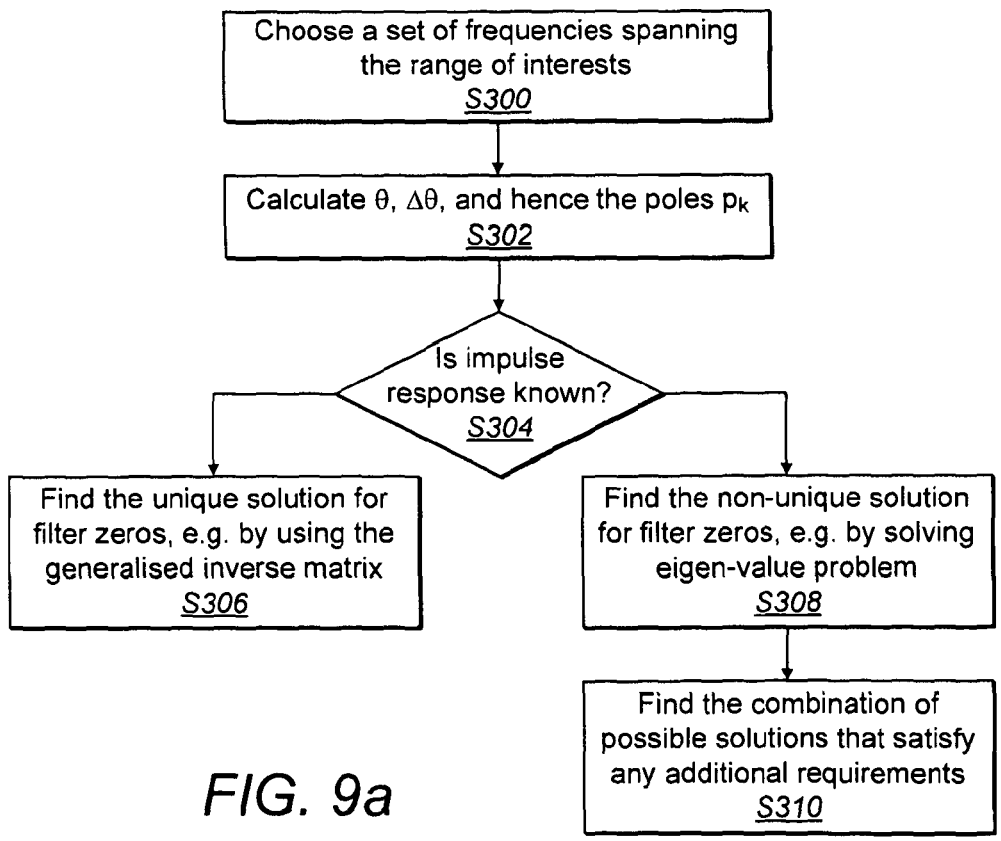
FIG. 9a is a flow chart of an alternative method for creating an initial filter set.

As set out in FIG. 9a, the first step S300 is to choose a set of frequencies spanning the frequency range of interest. The set of frequencies may be linearly, logarithmically or otherwise nonlinearly distributed across the frequency range of interest. For example, the frequency range of the filter may be from 150 Hz (bot) to 600 Hz (top). Q (and q) is an abbreviation for quiet (i.e. the minimum response) and L (and l) is an abbreviation for loud (i.e. the maximum response). Thus the initial variables are defined as:

$$Time = Qdata^{(0)}$$

$$chans = cols(Qdata) - 1$$

$$q^{(j)} = Qdata^{(j+1)}$$

$$l^{(j)} = Ldata^{(j+1)}$$

$$F_s = \frac{length(time) - 1}{time_{last(time)} - time_0}$$

$$F_s = 5512.5 \text{ (the sampling frequency)}$$

An IIR filter is used to create the desired effect. An IIR is an infinite impulse response filter. Such filters use feedback since the output and next internal state are determined from a linear combination of the previous inputs and outputs. A second order IIR filter is often termed a biquad because its transfer function is the ratio of two quadratic functions, i.e.

$$Hz(z, d) = \sum_k \frac{d_{k,0} + D_{k,1} \cdot z^{-1} + d_{k,2} \cdot z^{-2}}{(1 - p_k \cdot z^{-1}) \cdot (1 - \overline{p_k} \cdot z^{-1})}$$

The transfer function of such a filter has two poles and two zeros. A pole of a function $f(z)$ is a point $a$ such that $f(z)$ approaches infinity as $z$ approaches $a$ and a zero is a point $b$ such that $f(z)$ equals zero when $z$ equals $b$. Thus, the $d_{k,0}$ $d_{k,1}$ $d_{k,2}$ co-efficients determine the zeros and the $p_k$ coefficients determines the poles. The set of frequencies within the frequency range of interest is associated with a corresponding pole, where k may equal the number of frequencies within the set, equal to the number of poles.

The pole coefficients $p_k$ may be written as:

$$p_k := e^{-0.5 \Delta \theta_k} \cdot \theta^{-j \theta_k}$$

Figure 9B:
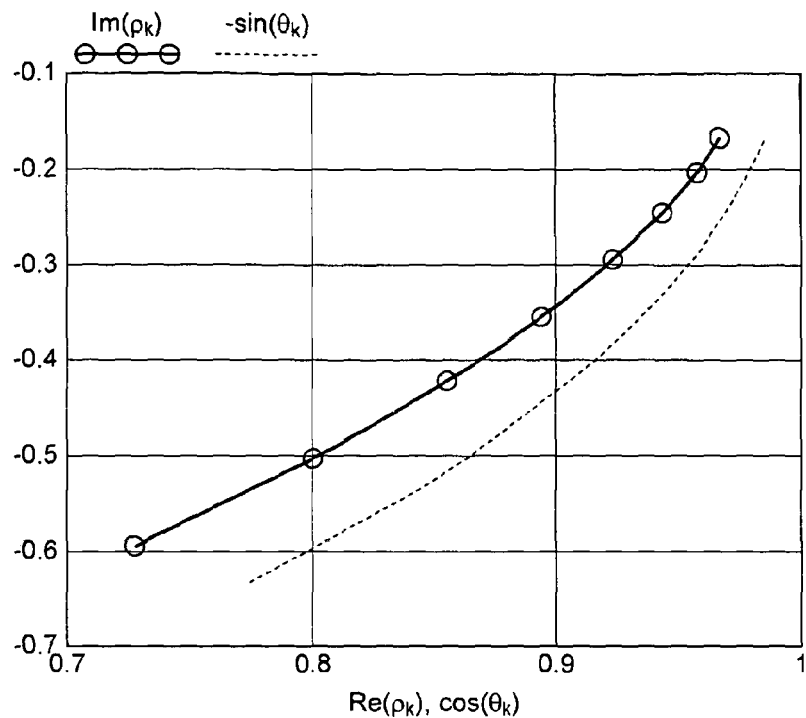
FIG. 9b is a graph plotting the imaginary part against the real part for $p_k$ and $-\sin(\theta_k)$ against $\cos(\theta_k)$.

As shown in FIG. 9a, the next step S302 of the method is to calculate $\theta_k$ and $\Delta \theta_k$ which may be derived from the initial variables as follows:

$$K = floor\left(per \cdot log\left(\frac{top}{bot}, 2\right) - 0.5\right) \quad K = 8$$

$$k := 0 \ldots K - 1$$

$$k1 := 1 \ldots K - 2$$

$$t_k := bot\left(\frac{top}{bot}\right)^{\frac{k}{K-1}}$$

$$t_{K-1} := top$$

$$\theta_k := \frac{2 \cdot \pi \cdot t_k}{Fs}$$

$$\Delta \theta_{K-1} = \theta_{K-1} - \theta_{K-2}$$

$$\Delta \theta_0 = \theta_1 - \theta_0$$

$$\Delta \theta_{k1} := \frac{\theta_{k1+1} - \theta_{k1-1}}{2}$$

Where K is the number of poles, $f_k$ is the frequency of the $k^{th}$ pole, $F_s$ is the sampling frequency, $\theta_k$ is an angle related to the frequency of the $k^{th}$ pole FIG. 9b plots the value of the imaginary part of the pole coefficient $p_k$ against the real part of $p_k$. FIG. 9b also plots the value of $-\sin(\theta_k)$ against $\cos(\theta_k)$ and shows the locus of pole positions $p_k$ plotted along with an arc of the unit circle in the z-plane.

The $p_k$ values are complex. If we wish to consider real coefficient values, the transfer function may be written as:

$$Hz(z, d) = \sum_k \left(\frac{d_{k,0} + d_{k,1} \cdot z^{-1} + d_{k,2} \cdot z^{-2}}{1 + a_{k,0} \cdot z^{-1} + a_{k,1} \cdot z^{-2}}\right)$$

Now the $a_{k,0}$ $a_{k,1}$ coefficients determine the poles. These coefficients may be written:

$$a_{k,0} := -2 \cdot e^{\frac{-\Delta \theta_k}{2}} \cdot \cos(\theta_k)$$

$$a_{k,1} := \theta^{-\Delta \theta_k}$$

i.e.

$$a_{k,0} = -2Re(p_k) \text{ and } a_{k,1} = |p_k|^2$$

At this step we also solve for the poles by considering:

$$\frac{Y}{X} = \frac{1}{1 + a0 \cdot z^{-1} + a1 \cdot z^{-2}}$$

$$Y(1 + a0 \cdot z^{-1} + a1 \cdot z^{-2}) = X$$

$$Y = X - (a0 \cdot z^{-1} + a1 \cdot z^{-2}) \cdot Y$$

For input signal X(z), the result of filtering with only the poles is Y(z), hence the transfer function is Y(z)/X(z). This is then algebraically manipulated to get a result without division, which can be directly converted to the time-domain representation u(i,k) which are defined as follows:

$$u_{0,k} := 1 \quad u_{1,k} := -(a_{k,0} \cdot u_{0,k}) \quad u_{i+2,k} := -(a_{k,0} \cdot u_{i+1,k} + a_{k,1} \cdot u_{i,k})$$

Figure 9C:
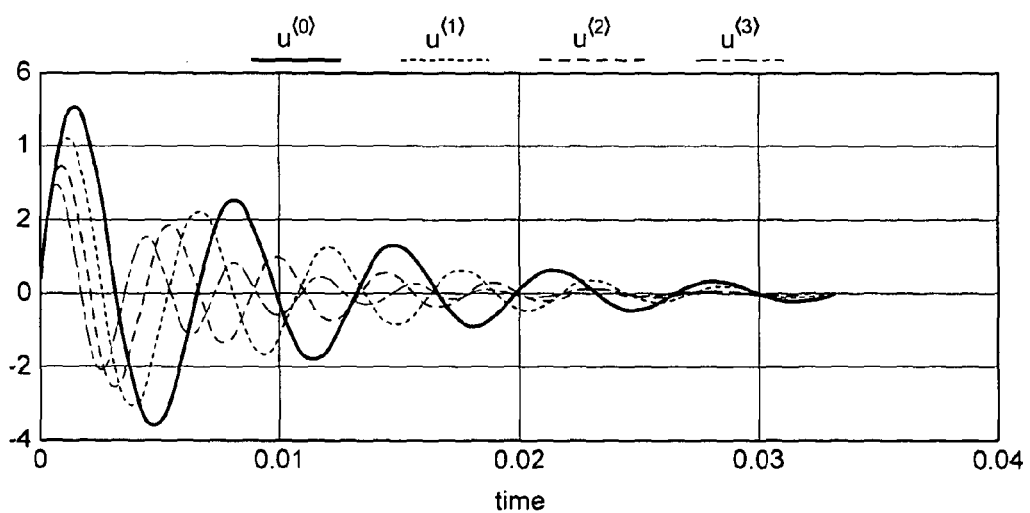
FIGS. 9c and 9d plot the eight variations of u with time.
Figure 9D:
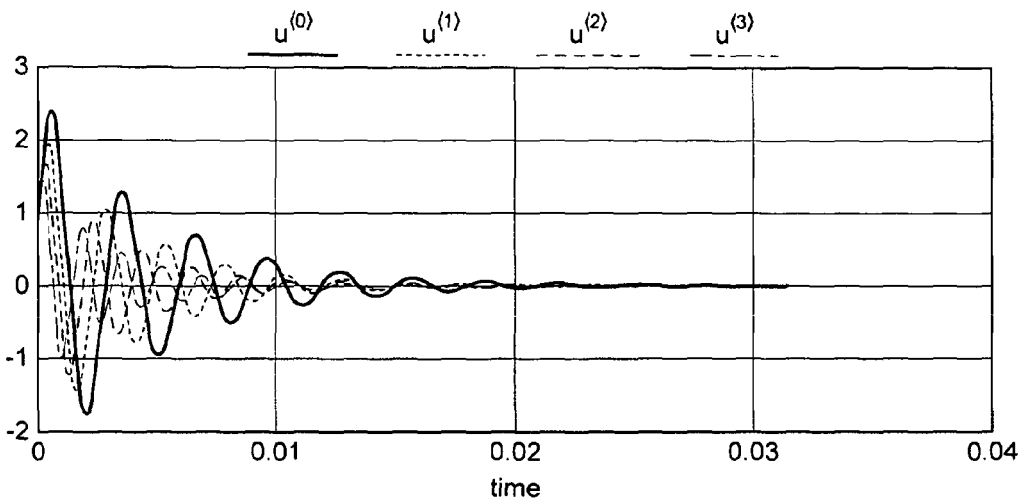

The variations in these functions with time are plotted in FIGS. 9c and 9d.

The next step is to solve for the zeros, i.e. to determine the coefficients $d_{k,0}$ $d_{k,1}$ etc. The zeros may be paired with the poles or they may be a different set of zeros. The zeros are determined from:

$$\frac{1}{2 \cdot d_{k,0}} \cdot \begin{bmatrix} d_{k,1} - \sqrt{(d_{k,1})^2 - 4 \cdot d_{k,0} \cdot d_{k,2}} \\ d_{k,1} + \sqrt{(d_{k,1})^2 - 4 \cdot d_{k,0} \cdot d_{k,2}} \end{bmatrix}$$

If the impulse response X(z) is known as shown in FIG. 9a at step S304, the unique solution may be found at step S306, e.g. by using the generalised inverse matrix which is defined as follows:

$$M_{i+\Delta, 3 \cdot k} := u_{i,k} \quad M_{i+\Delta+1, 3 \cdot k+1} := u_{i,k} \quad M_{i+\Delta+2, 3 \cdot k+2} := u_{i,k}$$
$$M_{i, 3 \cdot K+m} := \delta(i, m)$$
$$M := submatrix (M, 0, last(time), 0, cols(M) - 1) \quad MI := geninv(M)$$

The zero coefficients are then $d^{\langle j \rangle} := MI \cdot h^{\langle j \rangle}$ The calculated matrix is shown below:

$$d = \begin{array}{c|cccc} & 0 & 1 & 2 & 3 \\ \hline 0 & 3.405 & 2.672 & 42.262 & 15.453 \\ 1 & -0.537 & -3.023 & 4.175 & 1.281 \\ 2 & -2.112 & -2.489 & -35.365 & -18.147 \\ 3 & 2.287 & 7.815 & 60.95 & -0.504 \\ 4 & -0.437 & -3.615 & 7.214 & -0.873 \\ 5 & -0.743 & -8.985 & -48.999 & -5.914 \\ 6 & 20.899 & 3.204 & 49.812 & -12.642 \\ 7 & -0.587 & -2.456 & 13.298 & -1.674 \\ 8 & -20.614 & -1.808 & -25.871 & 5.237 \\ 9 & 10.879 & 10.881 & -6.574 & -40.342 \\ 10 & -1.759 & -6.355 & 11.212 & -5.183 \\ 11 & -12.464 & -17.547 & 29.148 & 27.938 \\ 12 & -24.895 & 12.807 & -4.562 & -75.415 \\ 13 & -12.819 & -5.264 & -15.278 & 0.249 \\ 14 & 4.693 & -17.369 & -24.445 & 76.935 \\ 15 & -9.55 & 6.87 & 32.191 & \ldots \end{array}$$

Rows(p)=8 with
Max (p)=09.67−0.167j and min (p)=0.729−0.594j
The pairs of zeros associated with the corresponding d values are thus:

$$z1_{k,j} := \frac{d_{3 \cdot k+1,j} - \sqrt{(d_{3 \cdot k+1,j})^2 - 4 \cdot d_{3 \cdot k,j} \cdot d_{3 \cdot k+2,j}}}{-2 \cdot d_{3 \cdot k,j}}$$

$$z2_{k,j} := \frac{d_{3 \cdot k+1,j} + \sqrt{(d_{3 \cdot k+1,j})^2 - 4 \cdot d_{3 \cdot k,j} \cdot d_{3 \cdot k+2,j}}}{-2 \cdot d_{3 \cdot k,j}}$$

The pairs of zeros relates to the zero coefficients d in the same way that the poles p relate to the pole coefficients a except that the zeros cannot be asserted to appear as complex conjugate pairs.

The synthesised transfer function (hs) for each filter to be applied to each transducer to give the required vibration of the member may then be determined from:

$$hs_{\Delta+i,j} := \sum_k (uf(i,k) \cdot d_{3 \cdot k,j} + uf(i-1,k) \cdot d_{3 \cdot k+1,j} + uf(i-2,k) \cdot d_{3 \cdot k+2,j})$$

As set out above, there may be zeros which are not paired with poles. In this case, the transfer function may be written as:

$$Hz(z, d, b) = z^{-\Delta} \cdot \sum_k \left( \frac{d_{k,0} + d_{k,1} \cdot z^{-1} + d_{k,2} \cdot z^{-2}}{1 + a_{k,0} \cdot z^{-1} + a_{k,1} \cdot z^{-2}} \right) + \sum_m (b_m \cdot z^{-m})$$

Where the b terms are coefficients which define additional zeros with no associated poles. Such an additional term may be implemented as an additional filter which may typically be used to deal with excess-phase problems such as delay. In other words, each filter may comprise at least two separate filters which may be of different types. The individual transfer functions for each filter may be expressed as:

$$hs_{i,j} := hs_{i,j} + \sum_m (d_{3 \cdot K+m,j} \cdot \delta(i,m))$$

Where the first term for hs sums all the contributions from the first type of filter (e.g. biquad) and the second term adds in the additional contributions from a second filter (e.g. a discrete-time filter such as a finite impulse response (FIR)).

Alternatively, if the impulse response is not known, a solution may be derived as follows.

Consider Quiet and Loud impulse responses to be determined at two locations on the member. If the Quiet response is minimal or zero (this means no vibration of the member at the Quiet location) and the Loud response is the loudest possible response (this means the largest possible vibration of the member at the Loud location), then there are a large number of possible impulse response filters for each transducer channel that can be used to obtain the Quiet response, whilst there is only one set of impulse response filters that gives the loudest possible response. Each set of filters that gives the minimal or zero quiet response at the quiet location will also give some response (which may be minimal or zero or may be non-zero) at the loud location. However, the set of filters yielding the loudest possible response at the loud position may not, and probably will not, yield minimal or zero output at the quiet location. For example the set of filters yielding the loudest signal at the loud location may put the member in whole body vibration, or the fundamental or a resonant mode of vibration.

There is a non-unique set of solutions relating to sets of filters that yields a minimal or zero quite response at the quiet location, whilst leading to vibration of the member at the loud location. There may be no solution relating to sets of filters that yields a minimal or zero quiet response at the quiet location whilst yielding a maximum signal at the loud location.

The problem of finding an improved set of filters relates to finding the set of filters that maximises the loud signal at the loud location and at the same time minimises the quiet signal at the quiet location. The problem may be solved by considering the ratio between the quiet and loud signals, and choosing a set of filters that yields a minimal or zero response at the quiet location, determine the response at the quiet location, determine the associated response at the loud location for the same set of filters, and determine the ratio between the signals at the quiet and loud locations. By considering one, all or any of the sets of filters that yields a minimal or zero response at the quiet location the set of filters that minimises the ratio between the quiet response at the quiet location and the loud response at the loud location may be selected. These set of filters may be considered as the improved set of filters.

Further, linear combinations of the sets of filters that individually yield a minimal or zero response at the quiet location will also yield a minimal or zero response at the quiet location. Accordingly, the problem may be solved by selecting a linear combination of different ones of the sets of filters that yield a minimal or zero response at the quiet location, the linear combination being selected to maximise the response at the loud location.

Mathematically, a non-unique solution may be derived, for example by solving the eigenvalue problem as set out below at Step S308. Where we are deriving the non-unique solution, additional requirements may be imposed and only the combination of solutions that satisfies the additional requirements is generated (step S310).

Firstly we consider the quiet response:

$$MQ := \begin{vmatrix} M_{length(time)+1, 3 \cdot K \cdot chans-1} \leftarrow 0 \\ \text{for } k \in 0 \ldots K-1 \\ \text{for } j \in 0 \ldots chans-1 \\ \text{for } n \in 0 \ldots 2 \\ \text{for } k' \in 0 \ldots K-1 \\ \text{for } j' \in 0 \ldots chans-1 \\ \text{for } n' \in 0 \ldots 2 \\ MQ_{(j' \cdot K+k') \cdot 3+n', (j \cdot K+k) \cdot 3+n} \leftarrow \sum_{i=0}^{last(qs_{x,j})} \begin{pmatrix} sub(qs_{k,j} \cdot i - n) \cdot \\ sub(qs_{k',j'} \cdot i - n') \end{pmatrix} \\ MQ \end{vmatrix}$$

Where:

$qs_{k,j} := \text{convol}(u^{<k>}, q^{<j>})$ and $sub(v,n) := \text{if}(n<0, 0, v_n)$ Where $q^{<j>}$ are the determined quiet responses for the j channels.

Simultaneously we consider the loud response:

$ML_{n',n} := hls_n \cdot hls_{n'}$

Where $$hls_n := \sum_j \text{convol}[(hs_n)^{(j)} \cdot I^{(j)}]$$

Figure 9E:
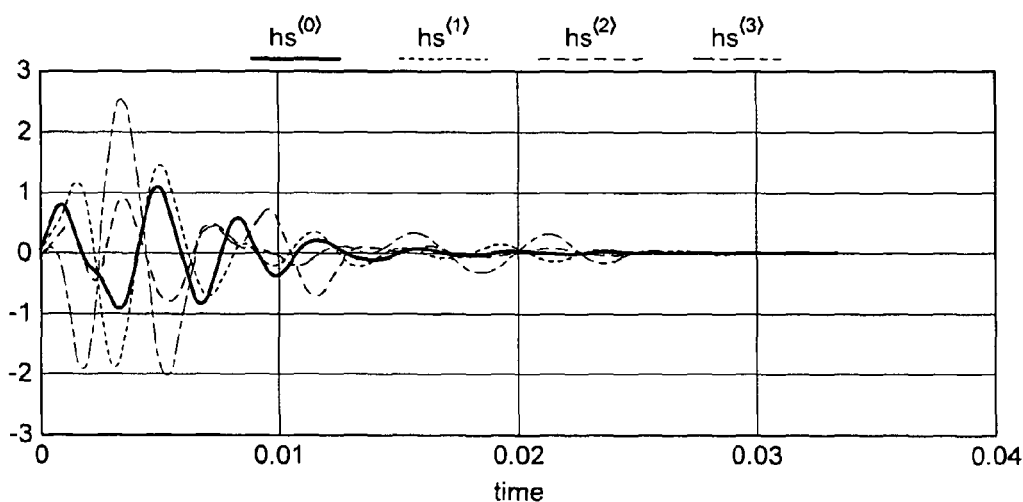
FIG. 9e shows the variation with time of the transfer functions for each of the four exciters, and FIGS. 10a and 10b plot the variation in time of the quiet and loud signals.

With $$hs_n := \begin{vmatrix} g \leftarrow E^{<n+pick>} \\ \text{for } i \in 0 \ldots rows(u)-1 \\ \text{for } j \in 0 \ldots chans-1 \\ hsn_{i,j} \leftarrow \sum_k \left[ \sum_{r=0}^{2} [g_{(j \cdot K+k) \cdot 3+r} \cdot sub(u^{(k)} \cdot i - r)] \right] \\ hsn \end{vmatrix}$$

and $E := \text{Re}(eigenvecs(MQ))$ $\lambda := eigenvals(MQ)$ $\text{pick} := \dfrac{K \cdot chans \cdot 3}{2} - 1$ $n := 0 \ldots K \cdot chans \cdot 3 - \text{pick} - 1$ $n' := 0 \ldots K \cdot chans \cdot 3 - \text{pick} - 1$ $EL := eigenvecs(ML)$ $\lambda L := eigenvals(ML)$ $c := EL^{(0)}$ $d := \sum_n (c_n \cdot E^{<n+pick>})$ The transfer function for each transducer is plotted in FIG. 9e and is calculated from:

$$hs_{i,j} := \sum_k \left[ \sum_{n=0}^{2} [d_{(j \cdot K+k) \cdot 3+n} \cdot sub(u^{(k)} \cdot i - n)] \right]$$

Figure 10A:
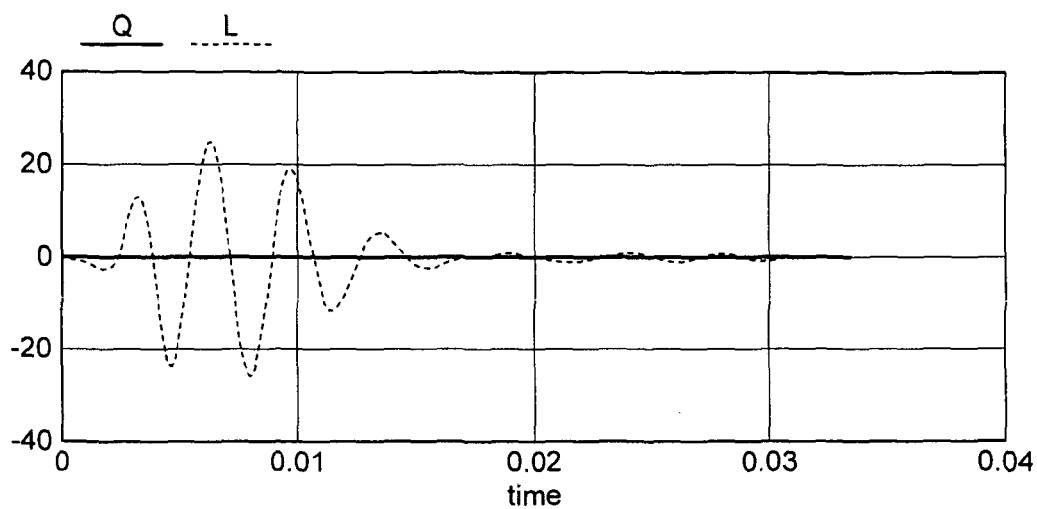

FIG. 10a plots the quiet and loud responses against time which are produced using these transfer functions. They are calculated from:

$Q := \sum_j \text{convol}(hs^{(j)}, q^{(j)})$ $L := \sum_j \text{convol}(hs^{(j)}, I^{(j)})$ $\dfrac{|Q|}{|L|} = 3.887 \times 10^{-3}$ The maximum response has a magnitude which is approximate 4000 times greater than the minimum response.

Figure 10B:
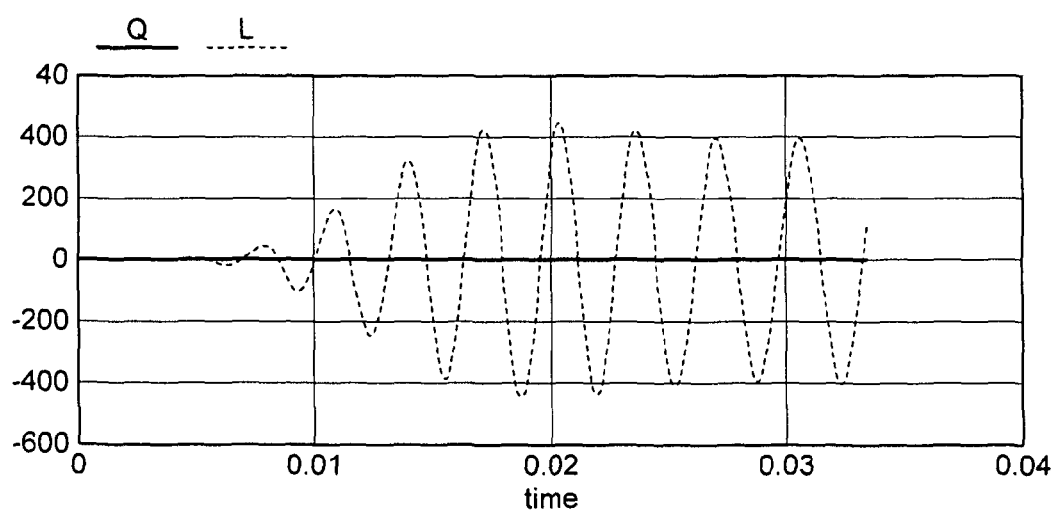

FIG. 10b shows the results using an appropriate input signal to each transducer. In this case, the input signal is a "touch bass (TB)" signal in which the time response of the modulated carrier wave signal is matched with the time response of a signal which produces the desired haptic sensation, namely a sensation having a frequency below the frequency bandwidth of the system. In this way, when a user touches a surface excited by the modulated signal, the user will demodulate the modulated signal into the required haptic response. Such a signal may be generated as described in PCT/GB2010/050578 (herein incorporated by reference).

Again the quiet and loud responses are plotted against time and they are calculated from:

$Q := \text{convol}(TB, Q)$ $L := \text{convol}(TB, L)$ $\dfrac{|Q|}{|L|} = 2.382 \times 10^{-3}$ The maximum response has a magnitude which is approximate 2000 times greater than the minimum response.

The apparatus described above may be implemented at least in part in software. Those skilled in the art will appreciate that the apparatus described above may be implemented using general purpose computer equipment or using bespoke equipment.

The hardware elements, operating systems and programming languages of such computers are conventional in nature, and it is presumed that those skilled in the art are adequately familiar therewith. Of course, the computing functions may be implemented in a distributed fashion on a number of similar platforms, to distribute the processing load.

Here, aspects of the methods and apparatuses described herein can be executed on a mobile device and on a computing device such as a server. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor.

Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage carrier, a carrier wave medium or physical transaction medium. Non-volatile storage media include, for example, optical or magnetic disks, such as any of the storage devices in computer(s) or the like, such as may be used to implement the encoder, the decoder, etc. shown in the drawings. Volatile storage media include dynamic memory, such as the main memory of a computer platform. Tangible transmission media include coaxial cables; copper wire and fiber optics, including the wires that comprise the bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will appreciate that while the foregoing has described what are considered to be the best mode and, where appropriate, other modes of performing the invention, the invention should not be limited to specific apparatus configurations or method steps disclosed in this description of the preferred embodiment. It is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Those skilled in the art will recognize that the invention has a broad range of applications, and that the embodiments may take a wide range of modifications without departing from the inventive concept as defined in the appended claims.

Although the present invention has been described in terms of specific exemplary embodiments, it will be appreciated that various modifications, alterations and/or combinations of features disclosed herein will be apparent to those skilled in the art without departing from the spirit and scope of the invention as set forth in the following claims.

The invention claimed is:

1. A method of generating a desired haptic sensation in a device comprising a member and a plurality of transducers mounted to the member, the method comprising:
 a) determining an initial estimate of a filter to be applied to a respective signal input to each transducer whereby application of the filtered input signals to the transducers generates vibration of the member which provides a haptic sensation;
 b) defining a model of the system whereby the vibration of the member can be calculated as a function of the input signal, the model having a plurality of parameters;
 c) calculating the vibration of the member as an output of the model of the system;
 d) calculating a reference error value for the output of the model by comparing the output of the model with a measured value of vibration of the member;
 e) determining changed parameter values of the parameters of the model;
 f) recalculating the error value for the output of the model with the changed parameter values by comparing the output of the model with the changed parameter values to the measured value of vibration of the member;
 g) comparing the recalculated error value with the reference error value;
 h) if the compared recalculated error value is less than the reference error value, setting the recalculated error value as the reference error value, setting the changed parameter values as the model parameters, and repeating the steps c) to h), or
 if the compared recalculated error value is greater than the reference error value, outputting the model parameters;
 generating a new filter using the output model parameters; and
 applying the new filters to respective input signals applied to each transducer to generate vibration within the member to provide the desired haptic sensation.

2. The method according to claim 1, wherein the device is a touch sensitive device and the member is a touch sensitive member.

3. The method according to claim 1, wherein the filter has a plurality of coefficients, the number of filter coefficients being equal to the number of model parameters.

4. The method according to claim 1, wherein the model comprises an inverse of the filter.

5. The method according to claim 1, wherein the reference error value is calculated using:

$$SSE(a, b, \ldots ) = \sum_n |Y(n, a, b, \ldots ) - X(n)|^2$$

where X(n) is the measured value which is measured at n test points and Y(n) is the output of the system model where a, b are the parameter values.

6. The method according to claim 5, wherein determining changed parameter values of the parameters of the model comprises selecting parameters to reduce the value of SSE by finding the value of t that minimizes F(t) where $$F(t) = SSE\left(a + \frac{t \cdot \partial SSE}{\partial a}, b + \frac{t \cdot \partial SSE}{\partial b}, \ldots \right).$$

7. The method according to claim 6, comprising finding the value of t by estimating the vector gradient of error (grad (SSE)), changing all the model parameters proportionally to the estimated vector gradient of error, estimating F'(t)=0 and F''(t)=0 and determining t from the estimated derivatives of F(t) where $$grad(SSE) = \left(\frac{\partial SSE}{\partial a}, \frac{\partial SSE}{\partial b}, \ldots\right)^T$$

and $$F'(t) = \frac{\partial F}{\partial t} \text{ and } F''(t) = \frac{\partial^2 F}{\partial t^2}.$$

8. The method according to claim 7, comprising estimating the vector gradient of error with respect to each of the parameters by changing each parameter by a small amount, recalculating SSE and estimating the vector gradient of error using the difference between the reference value for SSE and the recalculated value of SSE.

9. The method according to claim 7, comprising estimating F'(t=0) and F''(t=0) by determining two new parameter sets, the first parameter set being changed proportionally to the estimated vector gradient of error by addition and the second parameter set being changed proportionally to the estimated vector gradient of error by addition, calculating SSE values for each of the two new parameter sets and calculating estimates for F'(t=0) and F''(t=0) from the new SSE values.

10. The method according to claim 1, wherein the reference error value is calculated using:

$$SSE = \frac{\left|\sum_{chan} Q_{chan} * h_{chan}\right|^2}{\left|\sum_{chan} L_{chan} * h_{chan}\right|^2}$$

where the star signifies the convolution product, $h_{chan}$ is the time impulse response for the filtered input signal at each transducer, $Q_{chan}$ is the output produced by each transducer at a relatively quiet location and $L_{chan}$ is the output produced by each transducer at a relatively loud location.

11. The method according to claim 10, wherein recalculating the error value comprises perturbing each time impulse response h by a small amount $\alpha$ at each transducer and calculating a new error value from $$SSE(\alpha) = \frac{\left|\sum_{chan} Q_{chan} * (h_{chan} + \alpha \cdot \delta_{chan,j} \cdot z^{-n} \cdot \delta(0))\right|^2}{\left|\sum_{chan} L_{chan} * (h_{chan} + \alpha \cdot \delta_{chan,j} \cdot z^{-n} \cdot \delta(0))\right|^2}$$

Where
z is the unit delay operator
$\delta$ is the delta (sampling) function and
$\delta_{i,j}$ is the Kronecker delta.

12. The method according to claim 11, wherein recalculating the error value comprises defining the gradient vector as follows;

$$grad(SSE)_{n,j} = \lim_{\alpha \to 0} \left(\frac{SSE(\alpha) - SSE}{\alpha}\right)$$

$$grad(SSE)_{n,j} = \frac{2}{\left|\sum_{chan} L_{chan} * h_{chan}\right|^2} \cdot \left(\begin{array}{l}(z^{-n} \cdot Q_j) \cdot \left(\sum_{chan} Q_{chan} * h_{chan}\right) - \\ SSE(z^{-n} \cdot L_j) \cdot \left(\sum_{chan} L_{chan} * h_{chan}\right)\end{array}\right)$$

and solving to find an exact value for the gradient vector.

13. The method according to claim 12, wherein recalculating the error value comprises determining the value at which the gradient vector is zero and recalculating the error value for this value.

14. The method according to claim 1, comprising determining the initial filter as a time-reversal filter.

15. The method according to claim 1, comprising determining the initial filter as a simultaneous multi-region filter.

16. The method according to claim 3, comprising determining the initial estimate using arbitrary filter coefficients.

17. The method according to claim 1, comprising determining the initial estimate using an infinite impulse response filter.

18. The method according to claim 1, wherein the desired haptic sensation is to produce a maximum response at one location on the touch sensitive member and a minimum response at a second location on the touch sensitive member.

19. A device comprising
   a member,
   a plurality of transducers mounted to the member, and
   a processor configured to:
   a) determine an initial estimate of a filter to be applied to a respective signal input to each transducer whereby application of the filtered input signals to the transducers generates vibration of the member which provides a haptic sensation;
   b) define a model of the system whereby the vibration of the member can be calculated as a function of the input signal, the model having a plurality of parameters;
   c) calculate the vibration of the member as an output of the model of the system;
   d) calculate a reference error value for the output of the model by comparing the output of the model with a measured value of vibration of the member;
   e) determine changed parameter values of the parameters of the model; f) recalculating the error value for the output of the model with the changed parameter values by comparing the output of the model with the changed parameter values to the measured value of vibration of the member;
   g) compare the recalculated error value with the reference error value; h) if the compared recalculated error value is less than the reference error value, set the recalculated error value as the reference error value, set the changed parameter values as the model parameters, and repeat the steps c) to h), or
   if the compared recalculated error value is greater than the reference error value, output the model parameters;
   generate a new filter using the output model parameters; and
   apply the new filters to respective input signals applied to each transducer to generate vibration within the member to provide the desired haptic sensation.

20. A method of generating a desired haptic sensation in a device comprising a member and a plurality of transducers mounted to the member, the method comprising:
   choosing a set of frequencies for generating said desired haptic sensation;
   determining an impulse response of a filter for each respective transducer to be applied to a signal input to each transducer, whereby application of the filtered input signals generates vibration of the member which provides the desired haptic sensation;
   calculating the transfer function of each filter, wherein each filter has a transfer function with at least one pole and at least one zero, and calculating the transfer function of each said filter comprises, determining at least one pole coefficient which determines at least one pole;

determining, using said at least one pole coefficient, a pole representation of the transfer function which filters said input signal using said at least one pole;

using said respective impulse response, calculating at least one zero coefficient which determines at least one zero; and combining said pole representation of the transfer function with said at least one zero coefficient to calculate said transfer function of said filter; and applying the calculated filters to input signals applied to the respective transducers to generate vibration within the member to provide the desired haptic sensation.

21. The method according to claim 20, wherein the device is a touch sensitive device and the member is a touch sensitive member.

22. The method according to claim 20 wherein the impulse response of each filter is derived from a measured value of vibration of the member.

23. The method according to claim 20 wherein each said filter is an infinite impulse response filter.

24. The method according to claim 23 wherein said infinite impulse response filter has a transfer function of the form:

$$Hz(z, d) := \sum_k \left( \frac{d_{k,0} + d_{k,1} \cdot z^{-1} + d_{k,2} \cdot z^{-2}}{1 + a_{k,0} \cdot z^{-1} + a_{k,1} \cdot z^{-2}} \right)$$

Where $d_{k,0}$ $d_{k,1}$ $d_{k,2}$ are zero coefficients which determine the zeros, $a_{k,0}$ $a_{k,1}$ $a_{k,2}$ are pole coefficients which determine the poles and k is the number of poles.

25. The method according to claim 24, wherein the pole coefficients are expressed as $a_{k,0}=-2\text{Re}(p_k)$ and $a_{k,1}=|p_k|^2$ and the transfer function is written as $$Hz(z, d) = \sum_k \frac{d_{k,0} + d_{k,1} \cdot z^{-1} + d_{k,2} \cdot z^{-2}}{(1 - p_k \cdot z^{-1}) \cdot (1 - \overline{p_k} \cdot z^{-1})}.$$

26. The method according to claim 24, comprising determining said pole representation of the transfer function from:

$$u_{0,k} := 1 \quad u_{1,k} := -(a_{k,0} \cdot u_{0,k}) \quad u_{i+2,k} := -(a_{k,0} \cdot u_{i+1,k} + a_{k,1} \cdot u_{i,k}).$$

27. The method according to claim 20, comprising determining the pole coefficients from the chosen set of frequencies.

28. The method according to claim 20, comprising calculating the zero coefficients using a generalized inverse matrix with the zeros being defined by:

$$z1_{k,j} := \frac{d_{3 \cdot k+1, j} - \sqrt{(d_{3 \cdot k+1, j})^2 - 4 \cdot d_{3 \cdot k, j} \cdot d_{3 \cdot k+2, j}}}{-2 \cdot d_{3 \cdot k, j}}$$

$$z2_{k,j} := \frac{d_{3 \cdot k+1, j} + \sqrt{(d_{3 \cdot k+1, j})^2 - 4 \cdot d_{3 \cdot k, j} \cdot d_{3 \cdot k+2, j}}}{-2 \cdot d_{3 \cdot k, j}}.$$

29. The method according to claim 20, further comprising calculating zero coefficients for zeros which are not paired with said determined pole coefficients.

30. A device comprising
a member,
a plurality of transducers mounted to the member, and
a processor configured to:
choose a set of frequencies for generating said desired haptic sensation;

determine an impulse response of a filter for each respective transducer to be applied to a signal input to each transducer, whereby application of the filtered input signals generates vibration of the member which provides the desired haptic sensation;

calculate the transfer function of each filter, wherein each filter has a transfer function with at least one pole and at least one zero, and calculating the transfer function of each said filter comprises, determine at least one pole coefficient which determines at least one pole;

determine, using said at least one pole coefficient, a pole representation of the transfer function which filters said input signal using said at least one pole;

using said respective impulse response, calculate at least one zero coefficient which determines at least one zero; and combine said pole representation of the transfer function with said at least one zero coefficient to calculate said transfer function of said filter; and apply the calculated filters to input signals applied to the respective transducers to generate vibration within the member to provide the desired haptic sensation.

31. A method of generating a desired haptic sensation in a device comprising a member and a plurality of transducers mounted to the member, the method comprising:

choosing a set of frequencies for generating said desired haptic sensation;

calculating a set of transfer functions of respective filters for each transducer to be applied to a signal input to each transducer, whereby application of the filtered input signals generates vibration of the member which provides the desired haptic sensation;

wherein each filter has a transfer function with at least one pole and at least one zero and calculating the transfer function of each said filter comprises, determining at least one pole coefficient which determines said at least one pole;

determining, using said at least one pole coefficient, a pole representation of the transfer function which filters said input signal using said at least one pole;

using an eigenvector method to determine at least one zero coefficient which determines said at least one zero; and combining said pole representation of the transfer function with said at least one zero coefficient to determine said transfer function for said filter; and applying the determined filters to input signals applied to the respective transducers to generate vibration within the member to provide the desired haptic sensation.

32. The method according to claim 31, wherein the device is a touch sensitive device and the member is a touch sensitive member.

33. The method of claim 31 wherein the eigenvector method comprises:

defining a first parameter of the desired haptic sensation;

using an eigenvector method to identify sets of possible filter transfer functions which satisfy the first parameter;

defining a second parameter of the desired haptic sensation;

using an eigenvector method to select from the identified sets of possible filter transfer functions which satisfy the first parameter, sets of possible filter transfer functions which satisfy the second parameter.

34. The method of claim 33 wherein the eigenvector method further comprises:
defining at least one further parameter of the desired haptic sensation; and
using an eigenvector method to select from the previously selected sets of possible filter transfer functions which satisfy the first parameter and second parameter, sets of possible filter transfer functions which satisfy the at least one further parameter.

35. The method of claim 31 wherein the selection selects a combination of possible filter transfer functions.

36. The method of claim 35 wherein the selection selects a linear combination of possible filter transfer functions.

37. The method according to claim 31 wherein said filter is an infinite impulse response filter.

38. A method according to claim 31, further comprising determining zero coefficients for zeros which are not paired with said determined pole coefficients.

39. A device comprising
a member,
a plurality of transducers mounted to the member, and
a processor configured to:
choose a set of frequencies for generating said desired haptic sensation;
calculate a set of transfer functions of respective filters for each transducer to be applied to a signal input to each transducer, whereby application of the filtered input signals generates vibration of the member which provides the desired haptic sensation;
wherein each filter has a transfer function with at least one pole and at least one zero and calculating the transfer function of each said filter comprises,
determine at least one pole coefficient which determines said at least one pole;
determine, using said at least one pole coefficient, a pole representation of the transfer function which filters said input signal using said at least one pole;
using an eigenvector method to determine at least one zero coefficient which determines said at least one zero; and
combine said pole representation of the transfer function with said at least one zero coefficient to determine said transfer function for said filter; and
apply the determined filters to input signals applied to the respective transducers to generate vibration within the member to provide the desired haptic sensation.

40. A non-transitory computer readable medium embedded with computer program code which, when executed on a processor of a touch sensitive device, will cause the touch sensitive device to:
a) determine an initial estimate of a filter to be applied to a respective signal input to each transducer whereby application of the filtered input signals to the transducers generates vibration of the member which provides a haptic sensation;
b) define a model of the system whereby the vibration of the member can be calculated as a function of the input signal, the model having a plurality of parameters;
c) calculate the vibration of the member as an output of the model of the system;
d) calculate a reference error value for the output of the model by comparing the output of the model with a measured value of vibration of the member;
e) determine changed parameter values of the parameters of the model;
f) recalculating the error value for the output of the model with the changed parameter values by comparing the output of the model with the changed parameter values to the measured value of vibration of the member;
g) compare the recalculated error value with the reference error value; h) if the compared recalculated error value is less than the reference error value, set the recalculated error value as the reference error value, set the changed parameter values as the model parameters, and repeat the steps c) to h), or
if the compared recalculated error value is greater than the reference error value, output the model parameters;
generate a new filter using the output model parameters; and
apply the new filters to respective input signals applied to each transducer to generate vibration within the member to provide the desired haptic sensation.

\* \* \* \* \*